US011410551B2

(12) United States Patent
Lund et al.

(10) Patent No.: US 11,410,551 B2
(45) Date of Patent: Aug. 9, 2022

(54) TECHNIQUES FOR UTILIZING A MOBILE DEVICE AS A PROXY FOR A VEHICLE

(71) Applicant: QUALCOMM Incorporated, San Diego, CA (US)

(72) Inventors: Benjamin Lund, Escondido, CA (US); Garrett Shriver, Santee, CA (US); Edwin Chongwoo Park, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/936,423

(22) Filed: Jul. 23, 2020

(65) Prior Publication Data

US 2022/0028264 A1    Jan. 27, 2022

(51) Int. Cl.
| | |
|---|---|
| *G08G 1/09* | (2006.01) |
| *G08G 1/0967* | (2006.01) |
| *H04W 4/02* | (2018.01) |
| *H04W 4/40* | (2018.01) |

(52) U.S. Cl.
CPC ...... *G08G 1/096716* (2013.01); *H04W 4/023* (2013.01); *H04W 4/40* (2018.02)

(58) Field of Classification Search
CPC ... G08G 1/096716; H04W 4/40; H04W 4/023
USPC ......................................................... 340/905
See application file for complete search history.

(56) References Cited

U.S. PATENT DOCUMENTS

| | | | |
|---|---|---|---|
| 9,381,813 B2* | 7/2016 | Hampiholi | .............. H04L 51/26 |
| 9,397,838 B1 | 7/2016 | Chen | |
| 10,163,276 B2* | 12/2018 | Kim | ........................ G01S 19/13 |
| 10,168,683 B2* | 1/2019 | Brew | .................. G10L 15/1807 |
| 10,257,340 B2* | 4/2019 | Adderly | ................. G10L 13/00 |
| 10,423,292 B2* | 9/2019 | Chan | ..................... G06Q 10/10 |
| 10,462,225 B2 | 10/2019 | Chen et al. | |
| 10,469,429 B2* | 11/2019 | Hardee | ................... H04L 51/24 |
| 10,530,719 B2* | 1/2020 | Anders | ................ H04L 51/063 |
| 10,558,794 B2 | 2/2020 | Myers et al. | |
| 10,679,446 B2 | 6/2020 | Santhosh et al. | |
| 10,750,005 B2* | 8/2020 | Keen | ....................... H04W 4/12 |

(Continued)

OTHER PUBLICATIONS

U.S. Appl. No. 16/936,425, filed Jul. 23, 2020, Lund et al.
U.S. Appl. No. 16/936,428, filed Jul. 23, 2020, Lund et al.

*Primary Examiner* — Zhen Y Wu
(74) *Attorney, Agent, or Firm* — Campbell C. Chiang; Weaver Austin Villeneuve & Sampson LLP

(57) ABSTRACT

Techniques described herein include utilizing a mobile device as a proxy receiver for a vehicle such that a driver of the vehicle can be presented driving assistance information based on messages received by the mobile device. The mobile device can determine that it is temporally located with the vehicle. If so, the mobile device can be configured to receive messages from other entities (e.g., vehicles, roadside units, traffic signals, and the like) in a vehicle-to-everything network. On reception, the mobile device may determine whether a received data message is relevant to the vehicle. In response to determining that the data message is, in fact, relevant to the vehicle, the mobile device may provide driving assistance information that is generated based at least in part on the information provided in the received data message.

26 Claims, 9 Drawing Sheets

(56) References Cited

U.S. PATENT DOCUMENTS

| | | | |
|---|---|---|---|
| 10,850,746 B2* | 12/2020 | Marti | B60K 35/00 |
| 10,893,010 B1* | 1/2021 | Argenti | H04L 51/26 |
| 11,165,591 B2 | 11/2021 | Thakore | |
| 2005/0197775 A1* | 9/2005 | Smith | H04W 4/024 |
| | | | 702/3 |
| 2009/0222902 A1 | 9/2009 | Bender et al. | |
| 2011/0098911 A1* | 4/2011 | Ellanti | G01C 21/3697 |
| | | | 701/532 |
| 2011/0141989 A1 | 6/2011 | Kondo | |
| 2015/0134428 A1* | 5/2015 | Li | G07B 15/063 |
| | | | 705/13 |
| 2015/0266377 A1* | 9/2015 | Hampiholi | H04W 4/14 |
| | | | 455/466 |
| 2015/0282083 A1 | 10/2015 | Jeong et al. | |
| 2016/0088052 A1 | 3/2016 | Juzswik et al. | |
| 2016/0119151 A1 | 4/2016 | Park et al. | |
| 2017/0032402 A1* | 2/2017 | Patsiokas | G06Q 30/0261 |
| 2018/0049274 A1 | 2/2018 | Kim et al. | |
| 2018/0059669 A1 | 3/2018 | Madigan et al. | |
| 2018/0213376 A1 | 7/2018 | Pinheiro et al. | |
| 2019/0096243 A1* | 3/2019 | Doig | G08G 1/091 |
| 2019/0132932 A1 | 5/2019 | Klecha et al. | |
| 2019/0200228 A1 | 6/2019 | Adrangi et al. | |
| 2019/0245703 A1 | 8/2019 | Simplicio Junior, Jr. et al. | |
| 2019/0279440 A1* | 9/2019 | Ricci | H04W 4/48 |
| 2020/0267739 A1 | 8/2020 | Nguyen et al. | |
| 2020/0365029 A1* | 11/2020 | Kourous-Harrigan | |
| | | | G05D 1/0231 |
| 2020/0389455 A1 | 12/2020 | Fang et al. | |
| 2021/0014655 A1 | 1/2021 | Stahlin | |
| 2021/0112386 A1* | 4/2021 | Lee | H04W 4/40 |
| 2021/0168609 A1 | 6/2021 | Nishimura | |

\* cited by examiner

TECHNIQUES FOR UTILIZING A MOBILE DEVICE AS A PROXY FOR A VEHICLE

BACKGROUND

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V21) communication between the vehicle and infrastructure-based devices (commonly-termed road side units (RSUs)), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE).

Autonomous and semi-autonomous vehicles, including vehicles with Advanced Driver-Assistance Systems (ADAS), can communicate and coordinate maneuvers using V2X. To help V2X-capable vehicles ("V2X vehicles") maneuver safely on the road, V2X vehicles can communicate intended maneuvers to other V2X vehicles. This can include maneuvers such as a lane change, intersection crossing, and the like, along with the corresponding time window for the behavior trajectory.

Legacy vehicles, which may or may not include vehicles with sensors and/or ADAS capabilities, may lack V2X capabilities and, thus, may not take advantage of the valuable data being communicated, or their involvement may be suboptimal. Many benefits of a vehicle-to-everything (V2X) environment depend on knowing the accurate inter-vehicle distances and relative locations as well as on having environmental and situational awareness. This type of location and location-related measurements are regularly communicated between vehicles, for example, through V2X using messages such as a Basic Safety Message (BSM). Both legacy vehicle drivers and autonomous (or semi-autonomous) vehicle drivers can benefit from this shared interaction and communication.

BRIEF SUMMARY

Techniques described herein provide for utilizing a mobile device as a proxy for a vehicle.

Some embodiments may include a method for a mobile device to provide driving assistance information. The method may include determining, by one or more processors of the mobile device, whether the mobile device is temporally collocated with a vehicle. The method may further include receiving, by the one or more processors via one or more transceivers of the mobile device, one or more data messages from a second device. The method may further include, in response to a determination that the mobile device is temporally collocated, determining, by the one or more processors, whether a data message of the one or more data messages received from the second device is relevant to the vehicle with which the mobile device is temporally collocated. The method may further include, in response to a determination that the data message is relevant to the vehicle, providing, by the one or more processors, driving assistance information based at least in part on the relevant data message. In some embodiments, the driving assistance information may be provided in response to a determination that the data message is relevant to the vehicle.

Some embodiments may include a mobile device. The computing device may comprise a memory storing executable instructions for providing driving assistance information and one or more processors communicatively coupled with the memory. In some embodiments, the one or more processors are configured to execute the instructions to cause the mobile device to perform operations. The operations may include determining, by one or more processors of the mobile device, whether the mobile device is temporally collocated with a vehicle. The operations may further include receiving, by the one or more processors via one or more transceivers of the mobile device, one or more data messages from a second device. The operations may further include, in response to a determination that the mobile device is temporally collocated with the vehicle, determining, by the one or more processors, whether a data message of the one or more data messages received from the second device is relevant to the vehicle with which the mobile device is temporally collocated. The operations may further include providing, by the one or more processors, driving assistance information based at least in part on the relevant data message. In some embodiments, the driving assistance information may be provided in response to a determination that the data message is relevant to the vehicle.

Some embodiments may comprise a non-transitory computer-readable medium. The non-transitory computer-readable medium may comprise stored instructions for providing driver assistance information. In some embodiments, the instructions, when executed by one or more processors of a mobile device, cause the one or more processors to perform operations. The operations may include determining whether the mobile device is temporally collocated with a vehicle. The operations may further include receiving, via one or more transceivers, one or more data messages from a second device. The operations may further include, in response to a determination that the mobile device is temporally collocated with the vehicle, determining whether a data message of the one or more data messages received from the second device is relevant to the vehicle with which the mobile device is temporally collocated. The operations may further include providing driving assistance information based at least in part on the relevant data message. In some embodiments, the driving assistance information may be provided in response to a determination that the data message is relevant to the vehicle.

Some embodiments may comprise a mobile device comprising means for determining whether the mobile device is temporally collocated with a vehicle. The mobile device may further comprise means for receiving one or more data messages from a second device. The mobile device can further comprise means for determining whether a data message of the one or more data messages received from the second device is relevant to the vehicle with which the mobile device is temporally collocated. In some embodiments, determining whether the data message is relevant to the vehicle may be performed in response to a determination that the mobile device is temporally collocated with the vehicle. The mobile device can further comprise means for providing driving assistance information based at least in part on the relevant data message, the driving assistance information being provided in response to a determination that the data message is relevant to the vehicle.

Figure 1:
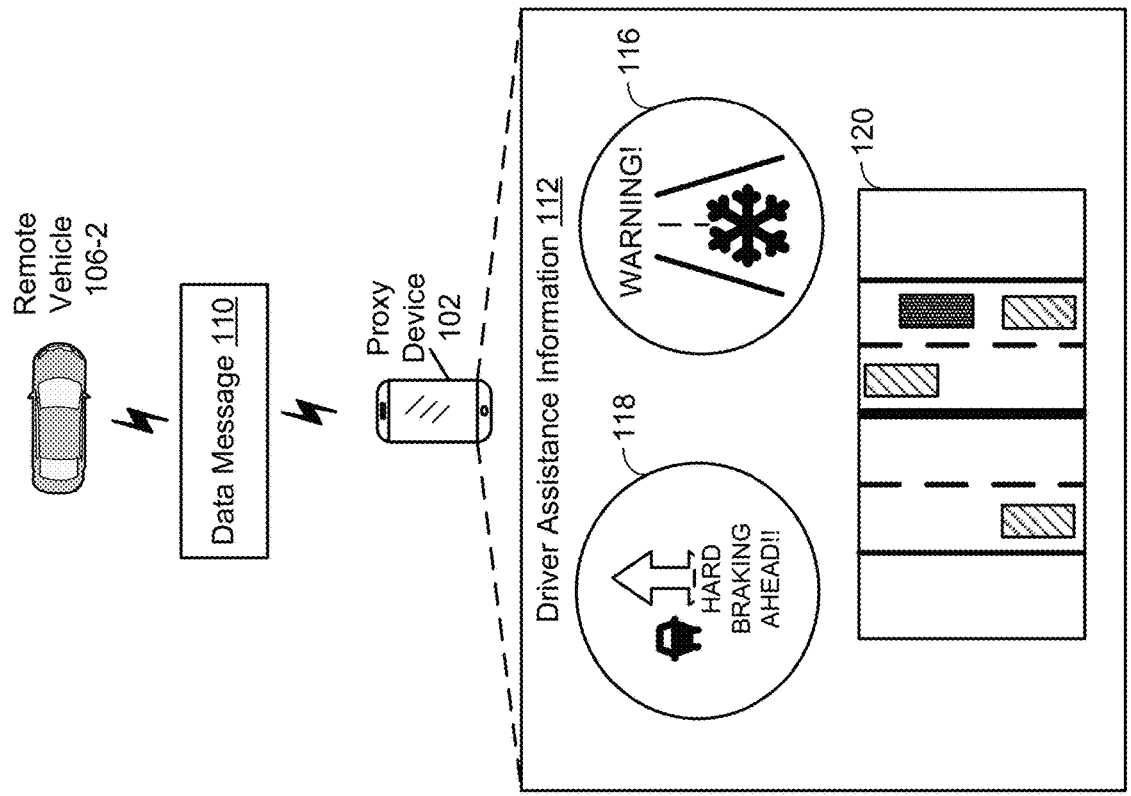
FIG. 1 is a simplified block diagram illustrating a mobile device being utilized as a proxy for a vehicle in a V2X environment, according to an embodiment.
Figure 1:
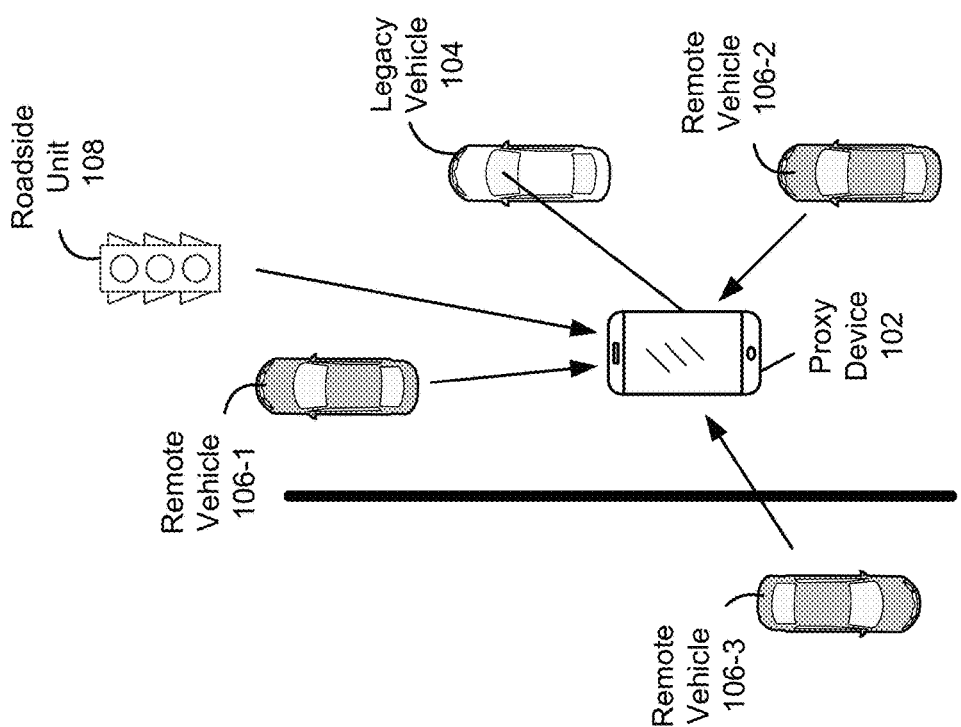

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

V2X-capable vehicles may execute vehicle-to-vehicle (V2V) safety applications built around Society of Automotive Engineers (SAE) J2735 BSMs, which communicate information about vehicle position, time, heading, speed, acceleration, predicted path, path history, and more. Other V2X messages may include, but are not limited to: cooperative awareness messages (e.g., used to announce position, movement, and basic attributes of a transmitting device), decentralized environmental notification messages (e.g., utilized to report detection of a traffic event or road hazard), signal phase and timing messages (e.g., information for one or more traffic lights), in vehicle information messages (e.g., used for providing static or dynamic road signage information for in-vehicle presentation), map messages (e.g., used for road topography and geometry information), and the like. In some embodiments, one or more V2X messages can include vehicle attributes (e.g., color, make, model, one or more images, ADAS capabilities license plate number, vehicle position, speed, heading, acceleration, location, lane number, etc.) of each of the vehicles sensed by a given Remote Vehicle (RV). Some of these capabilities may be transmitted by V2X message, received by the given RV, and retransmitted by the RV to other vehicles. Recipients of such data may include vehicles that now are aware of another vehicle even though they may not have a direct line of sight, nor any sensor data, and/or may be out of reception range to receive the message from its original source. Each RV can transmit any suitable combination of its own attributes via one or more V2X messages. This collective data can be used to inform nearby vehicles' movement and maneuver execution.

Not all vehicles are V2X capable. A vehicle that lacks the capability to transmit V2X messages is referred to herein as a legacy vehicle (LV). In some embodiments, a legacy vehicle may be one that lacks the ability to fully participate in V2X communications. For example, a legacy vehicle might be capable of transmitting certain V2X messages but lacks the ability to transmit and/or receive and/or process at least one other V2X message. The techniques provided herein are directed to the utilization of a mobile device as a proxy for the legacy vehicle, the mobile device providing functionality to augment the capabilities of the legacy vehicle. The mobile device may process V2X messages on behalf of the LV such that driver assistance information (e.g., alerts, alarms, audible output, graphical elements, maps, and the like) derived from the data elements of received V2X messages may be presented to the driver of the LV (e.g., via the mobile phone and/or via an interface of the LV).

The V2X capable vehicles and the mobile device operating as proxy (referred to herein as a Proxy Device (PD)) for an LV may receive a large number of broadcasted V2X messages from nearby V2X-capable vehicles within communication range, referred to herein as Remote Vehicles (RVs). For example, BSM messages may be broadcasted up to 10 times per second (10 Hz). Thus, if a PD is surrounded by 200 RVs each communicating up to 10 BSMs per second, the PD may need to process up to 2000 BSM messages per second. This processing can include verifying digitally-signed certificates of the messages and determining, based on the content of the messages, whether to issue a warning to a driver, alter or execute a maneuver, etc. Moreover, additional message types (e.g., non-BSM safety messages) may also be communicated to the PD from nearby RVs, and other communications may be received from Road-Side Units (RSUs), traffic-related servers, and more. Further, the information communicated by BSMs and other messages is often very time sensitive and must be processed quickly by the PD before it becomes irrelevant. Thus, the PD often has a limited ability to delay the processing of these incoming messages. This can cause a high processing load on the hardware block (e.g., Central Processing Unit (CPU), Digital Signal Processor (DSP), and/or Elliptic Curve Digital Signature Algorithm (ECDSA)) of the PD. Additionally, generating and/or providing driver assistance information (e.g., alerts, alarms, graphical presentations, audible presentations, maps, models, etc.) from the V2X messages utilizes processing resources of the mobile device (and potentially the processing resources of the LV if output devices of the LV are utilized for presentation of the driver assistance information).

Embodiments provided herein can address these and other issues by enabling a PD to filter incoming broadcasted messages from RVs. Traditionally, broadcasted messages are received by any V2X capable vehicle within a given range of the broadcast source. This could cause some PDs and V2X capable vehicles to unnecessarily process messages that have little to no relevance to an LV being proxied by a PD and/or the V2X vehicle. The techniques provided herein enable LVs to participate in the V2X network, allow for driver assistance information to be provided to the drivers of such vehicles, and enable a number of various filtering techniques such that a processing burden of the PD is minimized (e.g., reduced to processing only what is relevant to the proxied vehicle to which the PD corresponds, while irrelevant data is discarded). Additional details are provided herein below, with respect to the appended figures.

FIG. 1 is a simplified block diagram illustrating a mobile device being utilized as a proxy for a vehicle in a V2X environment 100, according to an embodiment. By way of example, FIG. 1 depicts proxy device 102 (e.g., an example of a mobile device) being utilized as a proxy for a legacy vehicle (LV) 104. LV 104 lacks communication capabilities and/or components for the V2X environment 100. That is, LV 104 cannot transmit and/or receive V2X data messages (e.g., data message 110, a BSM message) within V2X environment 100. It should be appreciated that PD 102 may be temporally located within LV 104 while being utilized as a proxy.

Each of the RVs depicted in FIG. 1 (e.g., RV 106-1, RV 106-2, RV 106-3, collectively referred to as "RVs 106") are V2X capable vehicles within a given range of LV 104. Additionally, roadside unit 108 is depicted within environment 100. Any suitable combination of RVs 106 and/or roadside unit 108 may transmit any suitable number of V2X messages (e.g., BSMs, etc.) which may be received by PD 102. It should be appreciated that, in some embodiments, before the PD 102 may act as a proxy device for LV 104 (e.g., receiving one or more data messages from RVs 106 and/or roadside unit 108 on behalf of LV 104), a credential, token, one or more public keys, a private key, or any suitable combination of the above may be required. By way of example, a certificate authority (not depicted) may issue a certificate that provides a public key of the certificate authority (CA). In some embodiments, this public key may be utilized by PD 102 to decrypt and/or verify the one or more data messages received. In some embodiments, without the CA's certificate/public key, the mobile device may not be able to participate (e.g., as a receiver) in the V2X environment described here. In any of the examples provided herein, received V2X messages may include a certificate issued by the CA and corresponding to the transmitting device. The PD 102 may utilize the CA's public key to decrypt the received certificate to retrieve the transmitting device's public key. The PD 102 may then utilize the public key to decrypt a portion(s) of the data message and/or to verify a digital signature included in the data message. If verifying the digital signature indicates the message has been tampered with, the PD 102 may be configured to discard the message.

In some embodiments, RV 106-2 may transmit data message 110. PD 102 may receive data message 110. The data elements of data message 110 may include any suitable data from which driver assistance information 112 may be derived. Driver assistance information, as used herein, is intended to refer to any suitable information which, if provided visually and/or audibly, can assist the driver of a legacy vehicle to understand one or more aspects of his surroundings.

By way of example, driver assistance information 112 can be used by PD 102 to derive alert 116, alert 118, and real-time traffic model 120. In some embodiments, alert 116 can include any suitable graphical presentation that informs the driver that the road may be and/or is icy. The alert 116 can be presented as depicted in FIG. 1, or the alert 116 may differ in presentation elements. The alert 116 can include visual components (e.g., one or more visual indicators) only or the alert 116 can include any suitable combination of visual or audible components. For example, the alert 116 can include an alarm or a sequence of alarms that can be sounded at substantially the same time as a graphical presentation of the alert 116.

As another non-limiting example, alert 118 may include another graphical presentation that include graphical elements (e.g., text, one or more icons, etc.) that inform the driver that a vehicle ahead is rapidly slowing down (e.g., hard breaking). The alert 118 can be presented as depicted in FIG. 1, or the alert 118 may differ in presentation elements. The alert 118 can include visual components (e.g., one or more visual indicators) only or the alert 118 can include any suitable combination of visual or audible elements. For example, the alert 118 can include an alarm and/or a sequence of alarms that can be sounded at substantially the same time as a graphical presentation of the alert 116.

The real-time traffic model 120 may be derived from any suitable number of data messages received by the PD 110. In some embodiments, the real-time traffic model 120 may include elements that indicate the location of various vehicles that are within a threshold distance of the PD 102. Aspects of the real-time traffic model 120 are described below in more detail in connection with FIG. 4.

Alert 116, alert 118, and real-time traffic model 120 are merely some examples of driver assistance information 112. It should be appreciated that the number and content of driver assistance information 112 may vary from the examples depicted in FIG. 1.

It should be appreciated that PD 102 need not transmit V2X messages on behalf of LV 104. However, in some embodiments, PD 102 may transmit a V2X message that indicates PD 102 is acting as proxy for LV 104. In some embodiments, other transmitting devices (e.g., RVs 106 and/or roadside unit 108) may utilize this knowledge when transmitting messages and/or displaying information about LV 104. One example may include displaying an indication that LV 104 is a legacy vehicle in a real-time traffic model based at least in part on receiving a message from the PD 102 indicating it is receiving messages on behalf of LV 104. One example real-time traffic model is described in more detail below in connection with FIG. 4. In some embodiments, the transmitting devices may be configured with a rule set that may cause the transmitting device to modify one or more data elements (or transmit different data elements) in a message if it is known that the recipient device is a proxy device (rather than a V2X capable vehicle).

Figure 2:
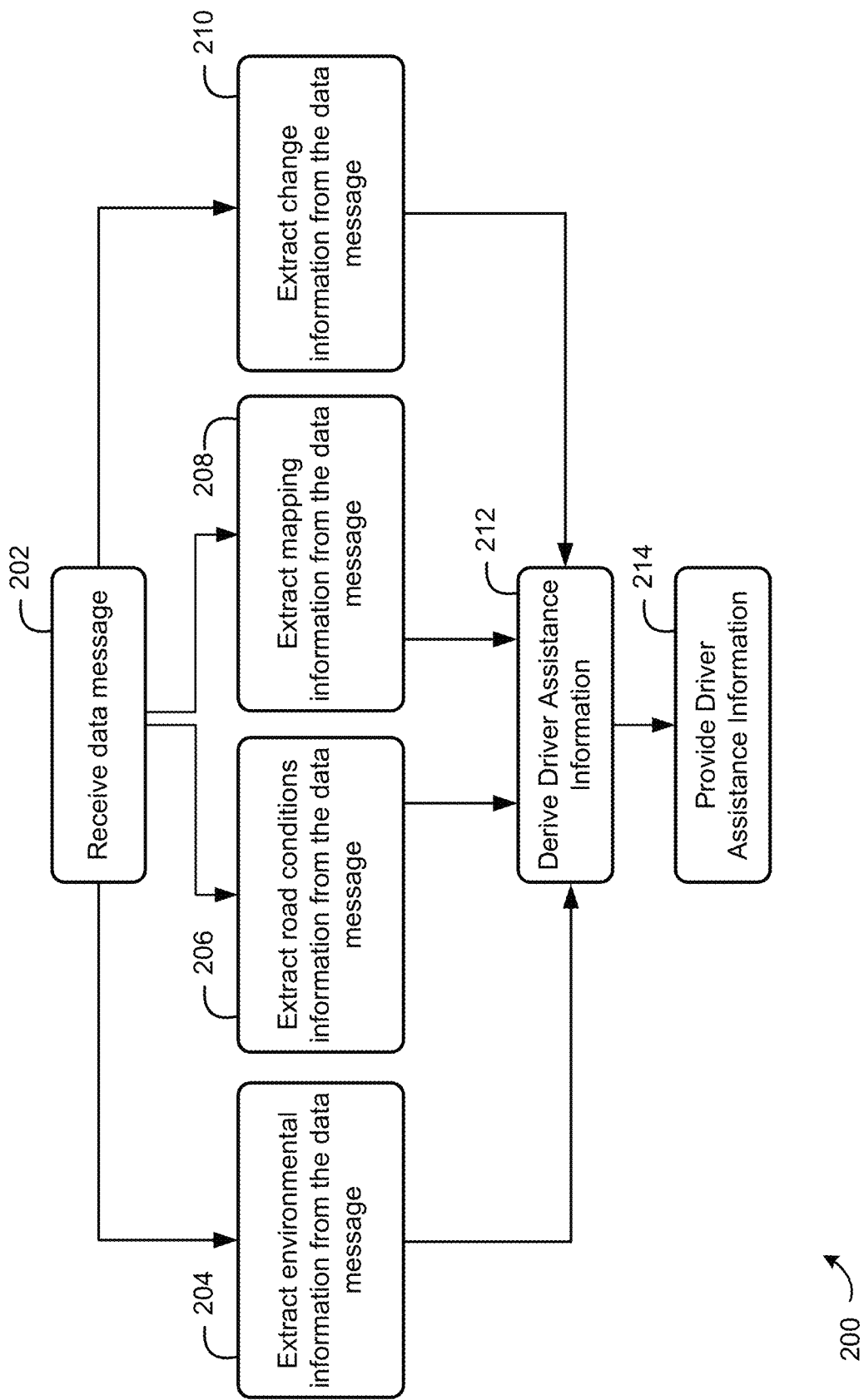
FIG. 2 is a flowchart depicting a method for receiving, by a mobile device, V2X message data from which driver assistance information is generated, according to an embodiment.

FIG. 2 is a flowchart depicting a method 200 for receiving, by a mobile device, V2X message data from which driver assistance information is generated, according to an embodiment. The method 200 may be performed by the PD 102 of FIG. 1 (e.g., an example of proxy device 900 of FIG. 9).

The method 200 may begin at block 202 where a data message is received. In some embodiments, the data message received at 202 may include, but is not limited to a basic safety message, a cooperative awareness message, a decentralized environmental notification message, a signal phase and timing message, a map message, and the like. A basic safety message can be used to announce vehicle position, time, heading, speed, acceleration, predicted path, path history, and/or any suitable attribute of the transmitting vehicle (e.g., or a vehicle associated with a transmitting device). A cooperative awareness message may be additionally or alternatively used to announce position, movement, and basic attributes of a transmitting device. A decentralized environmental notification message may be utilized to report detection of a traffic event or road hazard. A signal phase and timing message may be utilized to provide information associated with one or more traffic lights. An in-vehicle information message may include static and/or dynamic road signage information that can be provided for in-vehicle presentation. A map message may be used to provide road topography and geometry information. The above referenced messages are provided as examples, although other messages may be received at 202, not necessarily just the messages listed. The data message received at 202 may be provided by a V2X capable vehicle, a roadside unit (e.g., RSU(s) 525 of FIG. 5), and/or from servers 540, 545, 550, 555, 560, and 565 of FIG. 5.

At block 204, if environmental information is indicated by the data in the data message received at 202, then the environmental information may be obtained from the data message. In some embodiments, the environmental information could be implied by the data of the data message. For example, information indicating hard braking and/or quick acceleration/deceleration of a vehicle in a low-congested area (e.g., a low number of V2X messages from unique vehicles or traffic data information) could imply how the weather is affecting a driver's behavior or the vehicle's driving. In this example, the environmental information implied by the data message may be that it is raining and/or snowing in this particular area leading to the report driving behavior. In some embodiments, the environmental information could include any suitable combination of outside temperature, wind speed, rain status, snow status, fog status, ice status, humidity, or any suitable naturally occurring attribute of the nearby environment. The environmental information (and/or data from which the environmental information was obtained) may be stored in an object and/or another suitable container for subsequent use. The use of V2X messages to disseminate environmental information provides advantages over crowdsourcing. For example, for immediate issues such as "black ice" or snow affecting traffic, crowdsourcing may cause a larger number of devices to experience the issue than would be the case if a V2X signal was used. When the V2X message is transmitted because one device experienced/detected some condition, the other vehicles can remain safe but larger dissemination through crowdsourcing is still enabled.

At block 206, if road conditions information is included in the data message received at 202, then road conditions information may be extracted from the data message received at 202. The road conditions information could include any suitable combination of attributes indicating black ice (or a likelihood of black ice), physical objects on or near the road, standing water, flooding, chemical spills, and the like. If the data message includes road conditions information, such information may be extracted from the data message and stored. By way of example, the road conditions information may be stored in an object and/or another suitable container for subsequent use.

At block 208, if mapping information is included in the data message received at 202, then the mapping information may be extracted from the data message. The mapping information can include points of interest (e.g., schools, gas stations, grocery stores, police departments, parks, etc.), data indicating a degree of traffic congestion, a planned route associated with a vehicle (e.g., the transmitting vehicle), nearby intersections, freeways, and the like.

At block 210, if change information is included in the data message received at 202, then the change information may be extracted from the data message. The change information can include temporary (or long-term) changes to the surroundings. By way of example, a parade, a farmer's market, a school's end-of-day, the presence of an ambulance, and the like may be indicated in the change information.

It should be appreciated that the data message received at 202 may include any suitable combination of the environmental information, road conditions information, mapping information, and/or change information. Accordingly, in some embodiments, any suitable combination of the operations performed at block 204-210 may be performed.

At block 212, driver assistance information may be derived from the data extracted from the data message (e.g., any suitable combination of the data extracted at blocks 204-210). Driver assistance information may be generated (e.g., by the PD 102 of FIG. 1) according to a predefined protocol set. The predefined protocol set may specify particular graphical, visual, and/or audible elements to be provided to the user based on the type and/or values of the data elements extracted from the data message at 204-210.

At block 214, the driver assistance information may be provided. In some embodiments, the predefined protocol set may specify that particular driver assistance information is to be presented at the receiving device (e.g., PD 102) and/or at an output device of a vehicle associated with the PD 102. Thus, the driver assistance information may be presented at a speaker and/or a display of PD 102, and/or at a speaker and/or display of the vehicle or another device associated with the PD 102 in accordance with the rules of the predefined protocol set that are associated with the specific type of driver assistance information to be provided.

Figure 9:
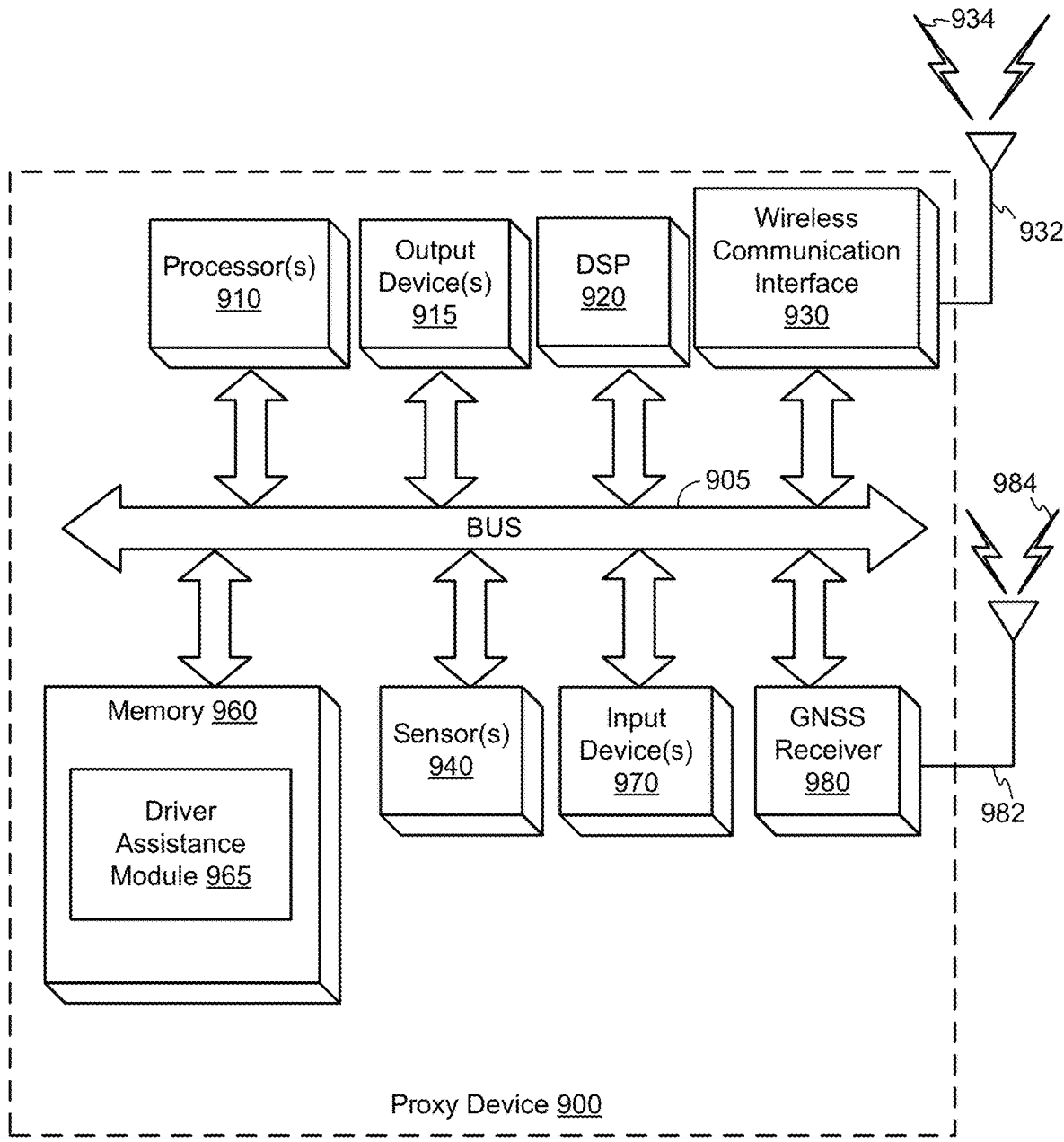
FIG. 9 comprises a functional block diagram of an example mobile device, according to an embodiment.

Means for performing method 200 may include one or more software and/or hardware components of a proxy device, such as a bus 905, processor(s) 910, memory 960, wireless communication interface 930 (including a wireless transceiver), driver assistance module 965, and output device(s) 915 as illustrated in FIG. 9, which is described in more detail below.

Figure 7:
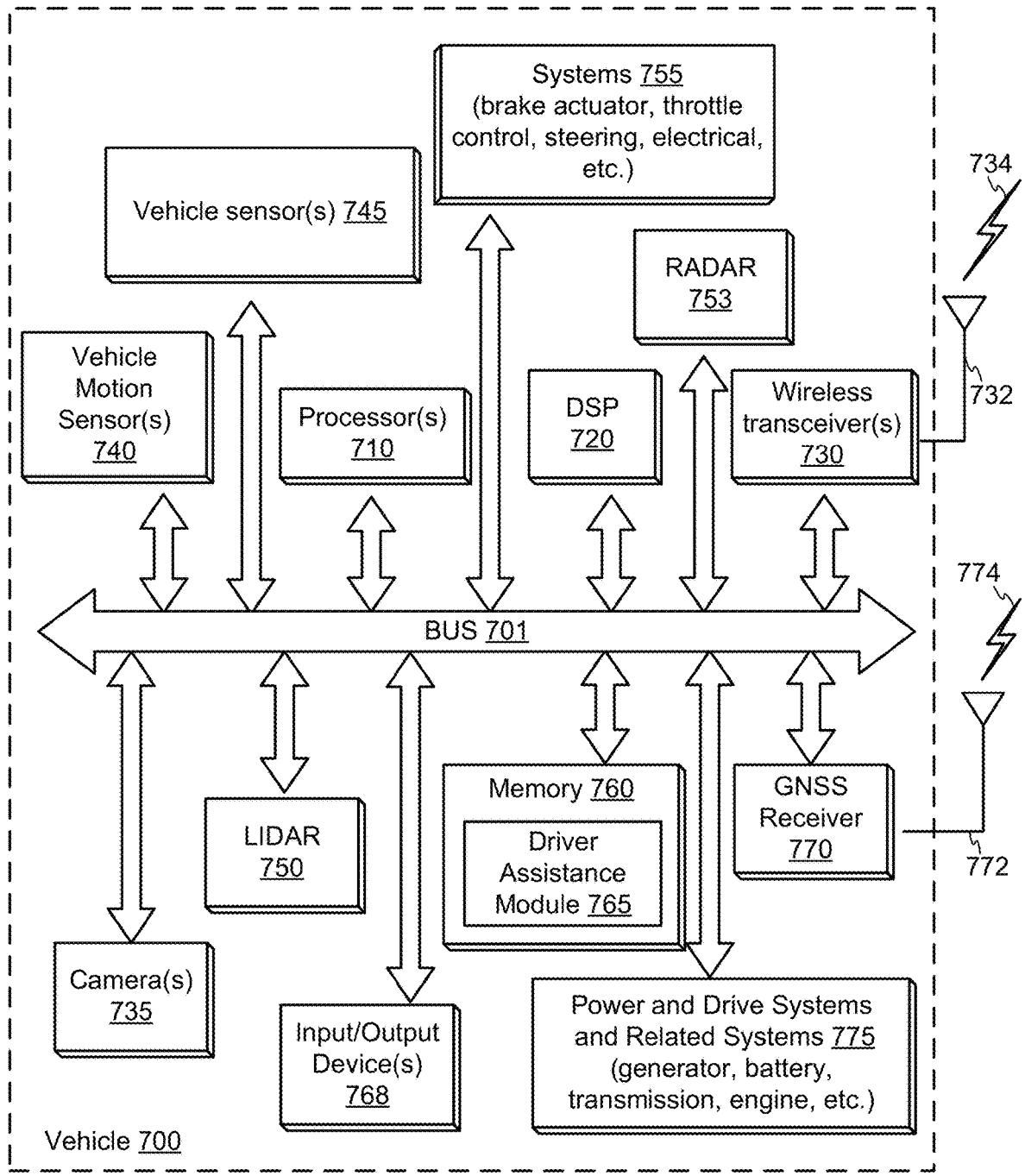
FIG. 7 is a block diagram of various hardware and software components of a vehicle, according to an embodiment.

In some embodiments, means for performing method 200 may include one or more software and/or hardware components of V2X capable vehicle (e.g., vehicle 700 of FIG. 7), such as a bus 701, processor(s) 710, memory 760, wireless transceiver(s) 730 (including a wireless transceiver), driver assistance module 765, and input/output device(s) 768 as illustrated in FIG. 7, which is described in more detail below.

Figure 3:
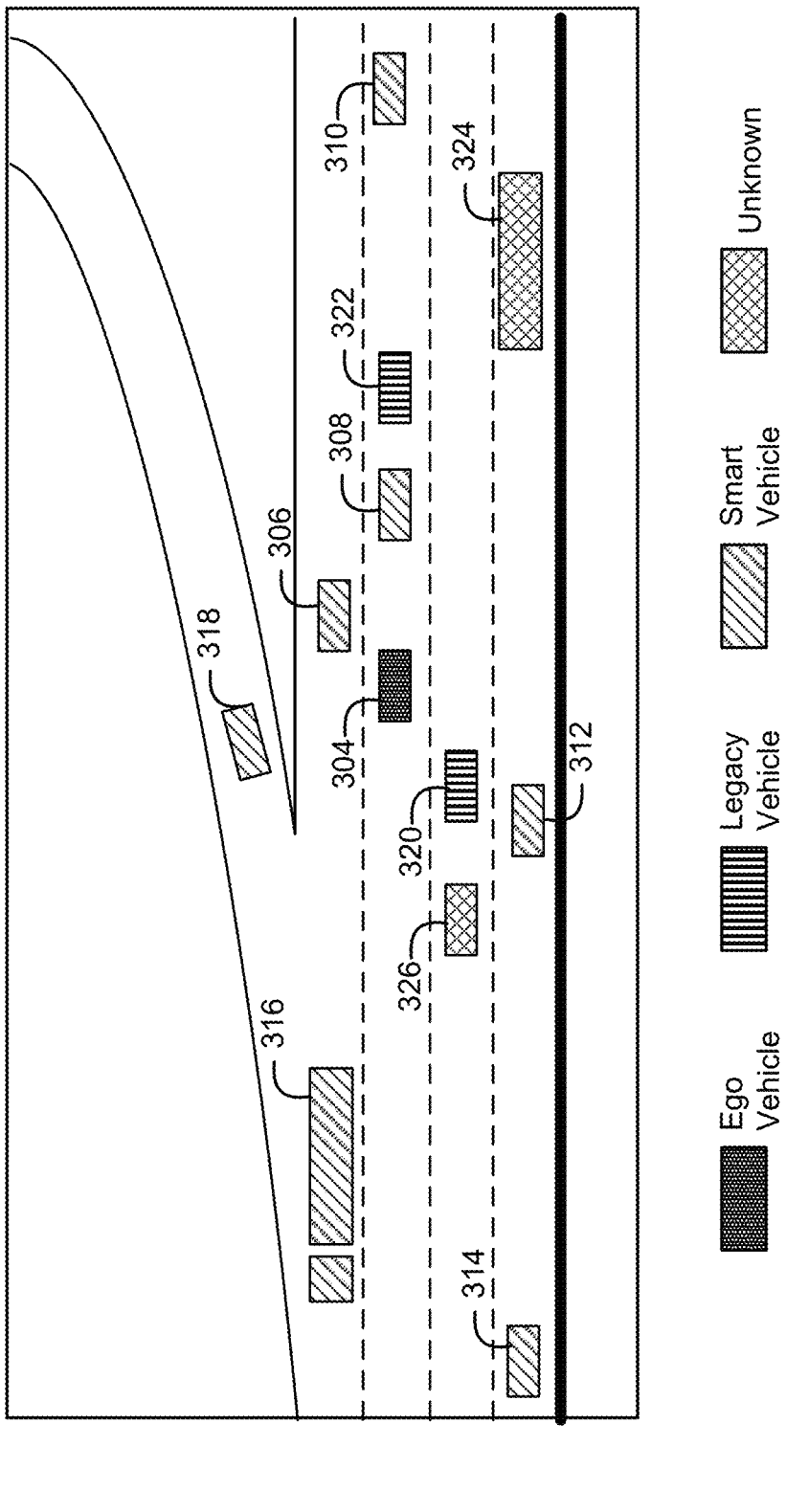
FIG. 3 is an example user interface for displaying driver assistance information, according to an embodiment.

FIG. 3 is an example of driver assistance information in the form of a real-time traffic model 300, according to an embodiment. In some embodiments, the real-time traffic model 300 may be generated by a proxy device (e.g., PD 102 of FIG. 1) or any suitable V2X capable vehicle. The data elements of the real-time traffic model 300 may be derived and generated based at least in part on data elements received via any suitable combination of V2X messages received from any suitable number of sources. In some embodiments, the real-time traffic model 300 may include a map representing an area and a number of vehicles within that area (e.g., vehicles 304-326).

As depicted in FIG. 3, the real-time traffic model. 300 depicts an "ego vehicle" which is the vehicle for which the real-time traffic model 300 is generated. The real-time traffic model 300 may be generated by components of the ego vehicle (e.g., processor(s) 710 of FIG. 7) or at least some aspects of the real-time traffic model 300 may be generated by the proxy device associated with the ago vehicle (e.g., by the processor(s) 910 of FIG. 9). In some embodiments, the ego vehicle may be depicted in a different color and/or style from the other graphical elements representing other vehicles such that the color and/or style visually distinguishes the ego vehicle from the other vehicles of the real-time traffic model 300. Each of the vehicles 306, 308, 310, 312, 314, 316, and 318 represent smart vehicles. Smart vehicles (e.g., RVs) are V2X capable vehicles that may be configured to transmit their respective vehicle attributes and/or vehicle attributes of the other vehicles sensed by the respective smart vehicles. Vehicles 320 and 322 are intended to depict Legacy Vehicles (e.g., vehicles that are not V2X capable but associated with a proxy device that is V2X capable and operates on behalf of the Legacy Vehicle to send and/or receive V2X messages). In some embodiments, vehicles 320 and 322 may be recognized as legacy vehicles based at least in part on receiving, from the corresponding proxy devices associated with vehicles 320 and 322, at least one V2X message that includes an indication that the vehicle is a legacy vehicle. In some embodiments, proxy devices may be configured to transmit an indication that they are acting as a proxy for a given vehicle. In some embodiments, the proxy devices may not necessarily transmit any messages.

By way of example, real-time traffic model 300 may include unknown vehicles 324 and 326. In some embodiments, these vehicles could be V2X capable vehicles that are simply not transmitting any data via V2X messages or some number of the unknown vehicles may be legacy vehicles that: 1) have no V2X capabilities and which are not associated with a proxy device, or 2) which are associated with a proxy device that is not transmitting V2X messages on behalf of that vehicle.

Each of the graphical elements of the real-time traffic model depicting vehicles 304-324 may correspond to a stored object maintained by the ego vehicle or a proxy device that operates as a proxy on behalf of the ego vehicle. In some embodiments, the object may store a correlation of data from many data sources. By way of example, an object corresponding to vehicle 306 may include data that was provided by the vehicle 306, and/or vehicle 308, and/or vehicle 322, or any suitable vehicle that has collected sensor data corresponding to vehicle 306. The object can store any suitable vehicle attribute such as color, make, model, image(s) of the vehicle, license plate number, speed, acceleration, heading, identifying features (e.g., broken left tail light, dent in right rear fender, broken windshield, etc.), vehicle states (e.g., on fire, smoking, traveling well below the current speed limit, right blinker on, left blinker on, etc.).

In some embodiments, the graphical element depicting ego vehicle 304 may be generated from an object that stored vehicle attributes that are determined by the ego vehicle itself and/or a proxy device associated with the ego vehicle. If generated by a proxy device, the vehicle attributes may be identified based on sensor data collected at the vehicle and provided to the proxy device and/or the vehicle attributes may be identified based on sensor data collected by components of the proxy device. Thus, in some embodiments, the vehicle and its corresponding proxy device may transmit sensor data between one another. Thus, the vehicle can utilize the proxy device's sensor data to supplement its own and/or the proxy device can utilize sensor data of the vehicle to supplement its own. Thus, if real-time traffic model 300 is generated by a proxy device, it may be generated using an object that includes sensor data from the proxy device and/or sensor data from the vehicle on behalf of which the proxy device is operating as proxy. The object may further include any suitable combination of sensor data provided by the vehicles 308, 306, 318, 320, or any suitable combination of vehicles that has collected sensor data on the ego vehicle 304.

Utilizing the data provided by other vehicles, the ego vehicle 304 (or the proxy device of the ego vehicle 304) may learn various attributes of itself from other vehicles. Thus, the ego vehicle 304 (or proxy device of the ego vehicle 304) may ascertain it is a red car of a particular make and/or model based at least in part on information provided by other vehicles. In some embodiments, the ego vehicle 304 may store certain attributes of itself as defined by user input (e.g., referred to as "local attributes"). In some embodiments, the ego vehicle 304 (and/or its proxy device) may maintain an object that stored both the local attributes and the attributes of itself that were provided by other vehicles (e.g., referred to as "remote attributes"). Using this object with any suitable combination of local and/or remote attributes, it may be possible for other vehicles to direct particular V2X messages to the ego vehicle 304 by providing sensor data indicating various attributes of the ego vehicle 304 and/or by ascertaining various attributes from sensor data (e.g., by using image recognition techniques to identify the car is red and the make/model) and including the attributes in V2X messages transmitted. On receipt, the ego vehicle 304 (or its proxy device) may compare data elements of the received message to the local and/or remote attributes of its respective object. If at least some threshold of data elements match local and/or remote attributes, the ego vehicle (or its proxy device) may deem the message to be addressed to itself and may process the message accordingly.

The real-time traffic model 300 may include graphical elements representing unknown vehicles 324 and 326 even though those vehicles are not transmitting V2X messages about themselves (or at all). Rather, these graphical elements can be generated by the ego vehicle 304 (or its proxy device) based at least in part on sensor data collected by the ego vehicle 304 (or its proxy device) and/or other vehicles excluding the vehicles 324 and 326.

Each type of vehicle (e.g., ego, legacy, smart, unknown, etc.) may be visually distinguishable based at least in part on any suitable attribute (e.g., color, shape, text, etc.). It should be appreciated that the depiction of the real-time traffic model is intended to be illustrative and non-limiting.

Means for providing the real-time traffic model may include one or more software and/or hardware components of a proxy device, such as a bus 905, processor(s) 910, memory 960, wireless communication interface 930 (including a wireless transceiver), driver assistance module 965, and output device(s) 915 as illustrated in FIG. 9, which is described in more detail below.

In some embodiments, means for providing the real-time traffic model may include one or more software and/or hardware components of V2X capable vehicle (e.g., vehicle 700 of FIG. 7), such as a bus 701, processor(s) 710, memory 760, wireless transceiver(s) 730 (including a wireless transceiver), driver assistance module 765, and input/output device(s) 768 as illustrated in FIG. 7, which is described in more detail below.

Figure 4:
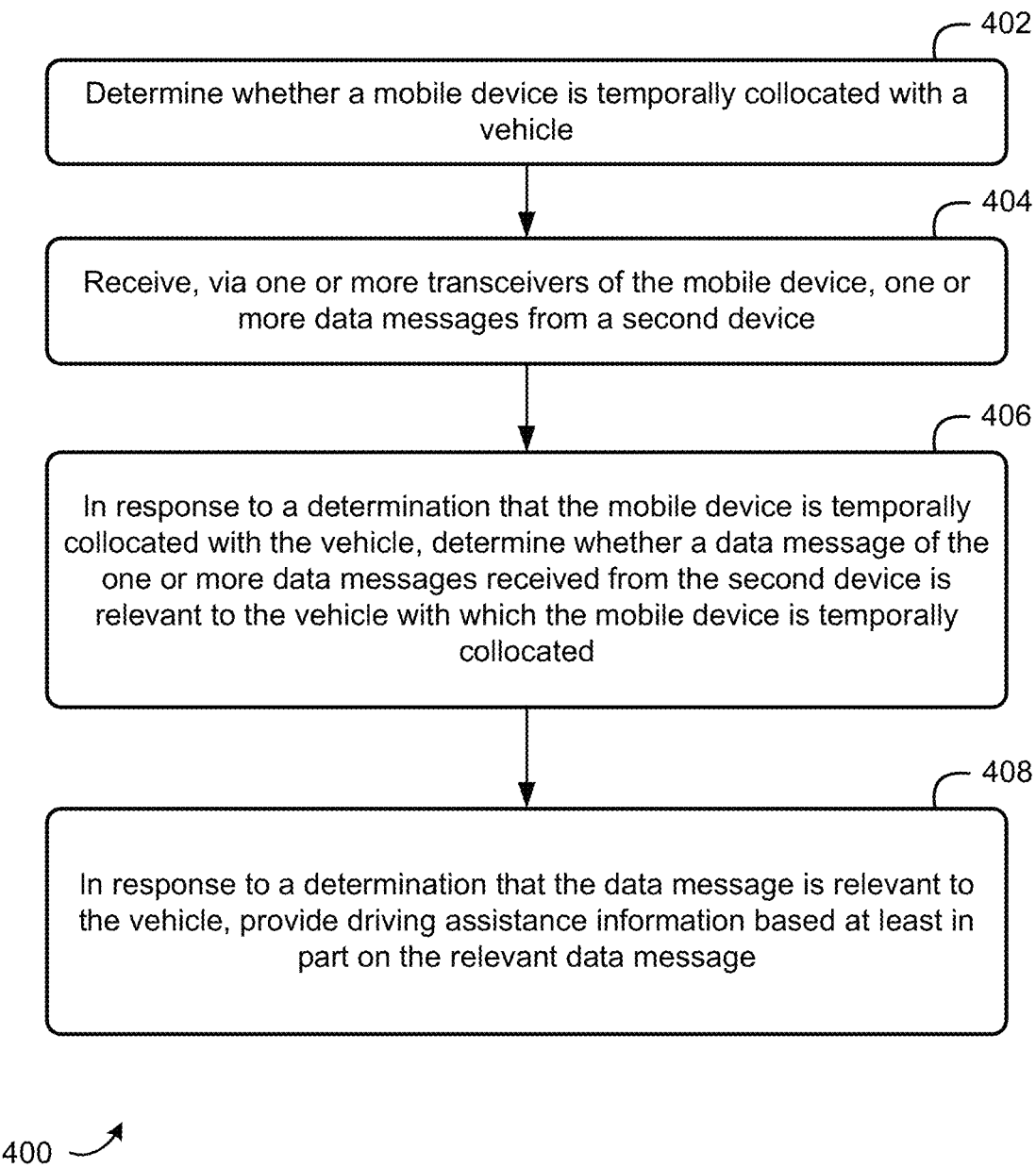
FIG. 4 is a flowchart depicting a method for utilizing a mobile device to provide driver assistance information, according to an embodiment.

FIG. 4 is a flowchart depicting a method 400 for utilizing a mobile device to provide driver assistance information, according to an embodiment. The method 400 may be performed by a mobile device (e.g., the proxy device 102 of FIG. 1, an example of the proxy device 900 of FIG. 9). Means for performing method 400 may include one or more hardware and/or software components of a proxy device (e.g., a mobile device), such as those illustrated in FIG. 9, which is described below.

The method may begin at 402, where it may be determined whether the mobile device is temporally collocated with a vehicle (e.g., the LV 104 of FIG. 1). Determining whether the mobile device is temporally collocated with the vehicle can be performed in a number of ways. For example, the mobile device may perform operations to pair with the vehicle (if the vehicle is Bluetooth enabled). Upon pairing to a vehicle, the mobile device may determine that it is temporally collocated with the vehicle. As another example, the mobile device may monitor (e.g., via one or more accelerometers, gyroscopes, and/or magnetometers of the mobile device) a speed and/or location of the mobile device. In some embodiments, the mobile device may identify (e.g., from location updates) that it is traveling at a speed that exceeds a threshold value (e.g., 20 mph, 25 mph, etc.). If this condition is met, the mobile device may be configured to determine it is temporally collocated with a vehicle. In some embodiments, the mobile device may compare its location with a location received in a data message provided by another entity (e.g., a remote vehicle, a roadside unit, etc.). It the mobile device's location is within a threshold distance of the location provided in the data message (corresponding to a vehicle), the mobile device may determine that it is temporally collocated within that vehicle (or at least a vehicle). Thus, in some embodiments, the operations at 402 may be performed prior to the operations of 404 or subsequent to the operations of 404. As yet another example, the mobile device may receive a data message from another source (e.g., a remote vehicle, a roadside unit, etc.) including vehicle attributes. In some embodiments, the mobile device may store one or more local vehicles attributes (e.g., obtained via user input). The mobile device may be configured to compare one or more vehicle attributes in the data message that corresponds to a vehicle which is sensed by the transmitting device. If more than a threshold number of local vehicle attributes match the vehicle attributes in the data message, the mobile device can determine it is temporally collocated in a vehicle. The mobile device may store any vehicle attributes provided in the data message for subsequent use. In some embodiments, the mobile device may be configured to treat the vehicle attributes provided in the data message as vehicle attributes of its associated vehicle.

At 404, one or more data messages may be received from a second device by one or more transceivers of the mobile device. It should be appreciated that, in some embodiments, before the mobile device may act as a proxy device (e.g., by receiving one or more data messages from a second device on behalf of a LV), a credential, token, one or more public keys, a private key, or any suitable combination of the above may be required. By way of example, a certificate authority (e.g., a government agency, a manufacturer, etc.) may issue a certificate that provides a public key of the certificate authority (CA). In some embodiments, this public key may be utilized by the mobile device (e.g., a PD) to decrypt and/or verify the one or more data messages received. In some embodiments, without the CA's certificate/public key, the mobile device may not be able to participate (e.g., as a receiver) in the V2X environment described here.

As described above in connection to FIG. 2, the one or more data messages may be any suitable combination of V2X messages including at least one of a basic safety message, a cooperative awareness message, a decentralized environmental notification message, a signal phase and timing message, a map message, or any suitable V2X message. The one or more data message may include any suitable data elements (e.g., data fields with corresponding values) indicating vehicle attributes (e.g., a vehicle position, time, heading, speed, acceleration, predicted path, path history, and/or any suitable attribute of a vehicle) corresponding to one or more vehicles (e.g., smart vehicles, legacy vehicles, or any suitable vehicle). The one or more data message may include data elements indicating the detection of a traffic event or road hazard. The one or more data message may include data associated with one or more traffic lights. The one or more data message may include static and/or dynamic road signage information that can be provided for in-vehicle presentation. The one or more data message may include road topography and geometry information. In some embodiments, at least some of the one or more data messages may include any suitable combination of environmental information, roadside information, mapping information, and/or change information.

At 406, the mobile device may determine whether a data message of the one or more data messages received from the second device is relevant to the vehicle with which the mobile device is temporally collocated. In some embodiments, determining whether the data message is relevant is performed in response to a determination that the mobile device is temporally collocated with the vehicle. As the mobile device receives data messages from remote vehicles and/or roadside units, the mobile device may be configured to identify whether the received data messages are relevant to the mobile device (e.g., do the data message pertain to the vehicle in which the mobile device is temporally collocated). If a data message contains certain information/data fields intended for all vehicles (e.g., weather updates, objects in the road, road condition information, etc.) then the mobile device can consider the data message to be relevant. Thus, in some embodiments, the type of data in the message may be used by the mobile device to identify whether the data of the message is relevant. These mobile device may make these determinations according to a predefined rule set that specifies particular types of data as relevant and/or not relevant.

As another example, if the one or more data messages contains information regarding a vehicle (e.g., a location of the sensed vehicle, data indicating a tail light is out on the sensed vehicle, images of the vehicle, etc.), the mobile device may check whether is associated with the indicated vehicle by checking whether the stored vehicle attributes matches the vehicle attributes of a given data message). In some embodiments, the mobile device may calculate a likelihood that the message relates to the vehicle for which the mobile device is acting as proxy. The likelihood may be proportional to the number of vehicle attributes that are common between the vehicle attributes previously stored by the mobile device and the vehicle attributes provided in the message. If the likelihood exceeds a threshold, the mobile device may be configured to determine the data message is relevant. In some embodiments, some vehicle attributes may be more popular than others. For example, white cars might be more prevalent than purple cars. Accordingly, vehicle attributes that are determined to be popular and/or more prevalent may be ignored or at least weighed less heavily than other vehicle attributes when determining whether the data message is relevant. By way of example, a vehicle attribute indicating a vehicle's right blinker is on may be weighted more heavily than an attribute indicating the car is white, based on a determination that the condition (e.g., the right blinker being on) is likely to be observed than observing a white vehicle.

In some embodiments, as the mobile device continues to receive data messages over time, commonly provided vehicle attributes (e.g., vehicle attributes that are provided many times over time and/or by different vehicles) may be more heavily factored into relevancy determinations than would be the case for vehicle attributes provided by another device relatively recently and/or vehicle attributes having values that have not been provided in other data messages. It is likely that the mobile device may receive the same vehicle attributes of the vehicle for which the mobile device is operating as proxy many times from other vehicles and/or roadside unit(s). Thus, over time the mobile device may be able to determine more confidently what the attributes of its vehicle are. In some embodiments, the mobile device may be configured not to store vehicles attributes reported by other entities (e.g., vehicles, roadside unit(s)) unless it has received those same attributes over a threshold number of times from different data messages. Once these values are stored however, the mobile device may be configured to use them in comparisons with received data messages to identify whether the data message contains enough vehicle attributes (over a threshold number) that are the same as the stored vehicle attributes, such that the data message may be considered relevant.

For example, the mobile phone could store some knowledge of vehicle attributes (e.g., the vehicle for which I operate as proxy is a white, four-door sedan, with license plate XYZ1234). Upon receiving a data message, the mobile device could compare vehicle attributes reported in the message (e.g., white color, four doors, license plate XYZ1234) and if more than a threshold number of attributes match, the mobile device can consider the data message to be relevant.

In some embodiments, and/or the mobile device can check the location provided in the data message to its own location and if the location of the message is within a threshold distance of the location of the mobile device, the mobile device can consider the data message to be relevant.

As yet another example, at any suitable time (e.g., prior to commencing a trip) a user of the mobile device may enter user preferences regarding data of which he desired to be informed. For example, it may be the case the user does not care particularly about environmental information indicating rain, snow, ice, etc. The mobile device may provide an interface with which the user may provide user input that is indicative of this preference. Thus, in some embodiments, the mobile device may utilize this user preference information to determine relevance of a given data message. For example, if the data message includes environmental information of the type the user has already indicated his disinterest via user preferences, the mobile device may be configured to determine the data message is irrelevant. Alternatively, in some embodiments, the mobile device may process some or all of data elements of the data message, but refrain from presenting corresponding driver assistance information in accordance with the user's preferences and/or based at least in part on the user's ability to comprehend and/or act on this information.

In some embodiments, the mobile device may be configured to determine whether the data message is relevant based at least in part on information known about the driver of the vehicle for which it acts as proxy. For example, a user of the mobile device may enter user input indicating driver attributes of the driver of the vehicle. These driver attributes can include any suitable combination of data such as number of years driving, age, number of accidents, types of accidents, number of speeding tickets and respective ticket information, and the like. In some embodiments, the mobile device may be configured with a protocol set (e.g., a set of rules) to identify certain data and/or data message to be relevant to some drivers and not others. By way of example, some environmental data such as an indication of icy roads may be determined by the mobile device to be relevant to the vehicle when the driver is an inexperienced driver (e.g., being associated with a number of driving years that is under a threshold number) but irrelevant when the driver is experienced (e.g., being associated with a number of driving years that is at or exceeds the threshold number).

In some embodiments, the mobile device may be configured to receive data from the vehicle for which it acts as proxy. By way of example, the mobile device may be configured to receive speed, heading, acceleration, turn signal data, and the like from its corresponding vehicle. Thus, in some embodiments, the mobile device may be configured to determine the relevancy of a given received data message based at least in part on this data provided by its vehicle. For example, if the mobile device is provided data by the vehicle indicating that the right turn signal is on (e.g., indicating the driver intends to travel to the right), the mobile device may be configured to identify a data message pertaining to a vehicle and/or object to its right as relevant, while by contrast it may determine objects and/or vehicles two lanes away to the left to be irrelevant.

In some embodiments, the mobile device may be configured to identify the data message as being relevant when the data message indicates only one vehicle is sensed by the transmitting device (e.g., the data message includes vehicle attributes for only one vehicle that is not the transmitting device). This presumes that if only one vehicle is sensed by the transmitting device, it is highly likely to be the vehicle in which the mobile device is collocated since the mobile device is within reception range. In this scenario, the mobile device may determine the data message is relevant. In some embodiments, the mobile device may store the vehicle attributes in an object it maintains for the vehicle for which it acts as proxy. In some embodiments, the mobile device may be configured to weigh this type of input more heavily than attributes obtained from data messages that included multiple vehicles' attributes due to the likelihood being higher that the vehicle attributes relate to the vehicle for which the mobile device acts as proxy.

As yet another example, the mobile device may be configured to perform a verification protocol with a transmitting device (e.g., another vehicle, a roadside unit, etc.). As a non-limiting example, the mobile device may receive vehicle attributes from a data message. Upon receipt or at another suitable time, the mobile device may emit sound or light in a predefined manner. This output may be potentially sensed by the transmitting device (e.g., a nearby vehicle). If so, the transmitting device and/or the mobile device can verify with one another, that the mobile device emitted certain particular sound and/or light output, that the sound and/or light output was sensed by the transmitting device, and that particular vehicle attributes transmitted by the transmitting device relate to the vehicle in which the sound and/or light output was sensed. In some cases, the mobile device may be communicatively connected with the vehicle for which it acts as proxy. In which case, the verification process may be performed using components of the proxied vehicle (e.g., turn signals, brake lights, headlights, interior lights, etc.). For example, the proxied vehicle may be instructed by the mobile device to emit one or more sounds and/or lights. As a non-limiting example, the proxied vehicle can be instructed to blink both taillights three times in relatively quick succession. The transmitting device and the mobile device can then verify with one another that the mobile device instructed the vehicle to blink its taillights three times and that the transmitting vehicle sensed (e.g., using vehicle sensor(s) 745) the light sequence.

In any case in which the mobile device determines a data message to be irrelevant, the mobile device may be configured to discard the message, or at least process the message differently which may include refraining from generating driver assistance information from data elements of the data message.

If the data message is determined to be relevant, the mobile phone can extract information from the data message and generate driver assistance information such as the driver assistance information 112 of FIG. 1 and/or the real-time traffic model 300 of FIG. 3 or any suitable interface element and/or alert for presenting information received from the data message to a user of the vehicle. The driver assistance information can include audible and/or visual components (e.g., visual indicators, sounds, etc.) and may be presented via components (e.g., a display, a speaker) of the mobile device and/or the vehicle.

It should be appreciated that any operation(s) for determining relevancy discussed above can be similarly performed by any V2X capable vehicle such that data messages received by that vehicle can be filtered to decrease the processing burden of the vehicle.

At 408, in response to a determination that the data message is relevant to the vehicle, the mobile device may provide driving assistance information based at least in part on the relevant data message. In some embodiments, the driver assistance information is data obtained from the relevant data message and/or data derived or generated from the data of the relevant data message. By way of example, if the data message is determined to be relevant, the mobile device can be configured to extract information from the data message (e.g., indicating locations of other vehicles, ADAS capabilities of one or more other vehicles, actions to be taken by other vehicles, images of other vehicles, weather information, objects in road, objects detected by other vehicles, and the like) and generate driver assistance information such as a real-time traffic model or any suitable interface element and/or alert for presenting information received from the data message to a user of the vehicle. The driver assistance information can include audible components (e.g., sounds, alarms, etc.) and/or visual components (e.g., visual indicators of any suitable size, shape, color, etc.) and may be presented via components (e.g., a display, a speaker) of the mobile device and/or the vehicle. In some embodiments, the data of the relevant message may itself be driver assistance information that is then provided (e.g., presented) via components of the mobile device and/or the vehicle.

FIGS. 5-8 are illustrations of systems, structural devices, vehicle components, and other devices, components, and systems that can be used to implement the techniques provided herein for detecting a degree of motion sickness that a person may be experiencing while traveling in an autonomously driven vehicle.

Figure 5:
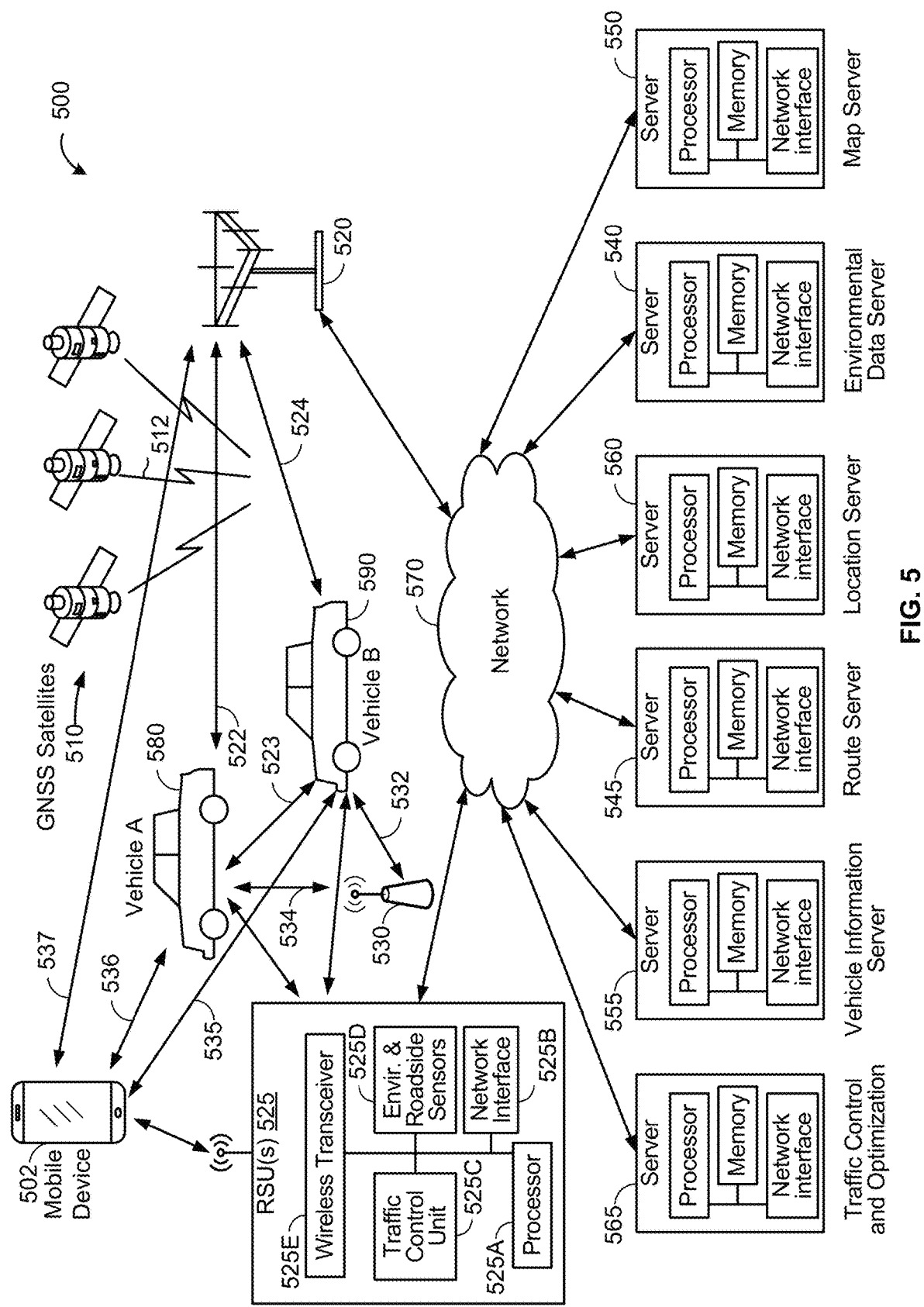
FIG. 5 is an illustration of a system in which vehicles may communicate over various networks and with various devices, vehicles, and servers, according to an embodiment.

FIG. 5 is an illustration of a system 500 in which vehicles (e.g., LV and/or RV) may communicate over various networks and with various devices, vehicles, and servers, according to an embodiment. In an embodiment, vehicle A 580 may communicate, using V2X or other wireless communication transceiver over link 523, with V2X or otherwise communication-transceiver-enabled vehicle B 590, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, and/or calculated status, and to exchange other V2X vehicle status steps that may not be covered in the V2X capability data elements. In an embodiment, vehicle A 580 may also communicate with vehicle B 590 through a network, for example, via wireless signals 522 to/from base station 520 and/or via wireless signals 532 to/from an access point 530, or via one or more communication-enabled RSU(s) 525, any of which may relay communication, information and/or convert protocols for use by other vehicles, such as vehicle B 590, particularly in an embodiment where vehicle B 590 is not capable of communicating directly with vehicle A 580 in a common protocol. In an embodiment, RSU(s) may comprise various types of roadside beacons, traffic and/or vehicular monitors, traffic control devices, and location beacons.

In some embodiments, vehicle A 580 may lack V2X communication components (or such communications components are faulty and/or disabled) such that it cannot send and/or receive V2X data elements with other entities of system 500 (e.g., vehicle B 590, RSU(s) 525, servers 540, 545, 550, 555, 560, 565, etc.). A vehicle that is unable to participate in V2X communications is referred to herein as a "legacy vehicle." Thus, in some embodiments, vehicle A 580 is a legacy vehicle. In some embodiments, mobile device 502, which is discussed further below in connection with FIG. 9, may be configured to act as a proxy on behalf of vehicle A 580. Mobile device 502 can send and/or receive V2X messages for V2X with any suitable combination of the entities of the system 500 (e.g., vehicle B 590, RSU(s) 525, servers 540, 545, 550, 555, 560, 565, etc.). Mobile device 502 may be configured to send and/or receive wireless messages in various protocols with vehicle A 580 (or any suitable component of vehicle A 580) by using various Wide Area Network (WAN), Wireless Local Area Network (WLAN), and/or Personal Area Network (PAN) protocols to communicate over a wireless communication network. In an embodiment, the mobile device 502 may comprise various combinations of WAN, WLAN and/or PAN transceivers. In an embodiment, these transceivers may include a Bluetooth® transceiver, a ZigBee transceiver, and/or other PAN transceiver. A local transceiver, a WAN wireless transceiver, and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with a mobile device 502 over a wireless link, and claimed subject matter is not limited in this respect.

In some embodiments, mobile device 502 may communicate with vehicle A 580 via link 536 or through a network, for example, via wireless signals 537 to/from base station 520 and/or via wireless signals 534 to/from an access point 530, or via one or more communication-enabled RSU(s) 525, any of which may relay communication, information and/or convert protocols for use by other vehicles, such as vehicle B 590, particularly in an embodiment where vehicle B 590 is not capable of communicating directly with vehicle A 580 in a common protocol.

Mobile device 502 may be configured to receive any suitable vehicle data from any suitable combination of components of vehicle A 580 (e.g., vehicle sensor(s) 745, vehicle motion sensor(s) 740, camera(s) 735, RADAR 753, LIDAR 750, power and drive systems and related systems 775, input/output device(s) 768, and/or systems 755) via one or more communication networks. Mobile device 502 may be configured with one or more sensors and may exchange locally acquired sensor data with the vehicle. In some embodiments, the mobile device 502 may be configured to interface (send and/or receive data) with the input/output device(s) 768 of FIG. 7). For example, the mobile device 502 may present data via the input/output device(s) 768 and/or the mobile device 502 may receive data (e.g., user input) collected and provided by the input/output device(s) 768 of vehicle A 580.

Mobile device 502 may be configured to generate driver assistance information (e.g., the driver assistance information 112 of FIG. 1) based at least in part on received V2X message data. By way of example, mobile device 502 may be configured with code (e.g., driver assistance module 965 of FIG. 9) that, when executed, causes visual and/or audible data (e.g., driver assistance information) to be generated that indicates at least a portion of the data received via one or more V2X messages. As a simplistic example, the mobile device 502 may receive a V2X message indicating that the vehicle located in from of vehicle A 580 is breaking hard. The mobile device 502 may determine the V2X message is relevant to vehicle A 580 and generate visual and/or audible data that may be presented at the mobile device 502 via a display and/or a speaker of the mobile device and/or at a display and/or speaker of the vehicle A 580 (e.g., via input/output device(s) 768). The visual and/or audible data may indicate the breaking is occurring up ahead, alerting the driver to the chance of collision. Some examples of driver assistance information are provided in FIGS. 1 and 3.

Mobile device 502 may communicate, using V2X or other wireless communication transceiver over link 535, with V2X or otherwise communication-transceiver-enabled vehicle B 590, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, and/or calculated status, and to exchange other V2X vehicle status steps that may not be covered in the V2X capability data elements. In an embodiment, mobile device 502 may also communicate with vehicle B 590 through a network, for example, via wireless signals 537 to/from base station 520 and/or via wireless signals 534 to/from an access point 530, or via one or more communication-enabled RSU(s) 525, any of which may relay communication, information and/or convert protocols for use by other vehicles, such as vehicle B 590, particularly in an embodiment where vehicle B 590 is not capable of communicating directly with vehicle A 580 in a common protocol.

In an embodiment, RSU(s) 525 may have a processor 525A configured to operate wireless transceiver 525E to send and receive wireless messages, for example, BSM or Cooperative Awareness Messages (CAM) or other V2X messages to/from vehicle A 580 and/or vehicle B 590 and/or mobile device 502, from base station 520 and/or access point 530. For example, wireless transceiver 525E may send and/or receive wireless messages in various protocols such as V2X communication with vehicles, and/or using various Wide Area Network (WAN), Wireless Local Area Network (WLAN), and/or Personal Area Network (PAN) protocols to communicate over a wireless communication network. In an embodiment RSU(s) 525 may contain one or more processors 525A communicatively coupled to wireless transceiver 525E and memory, and may contain instructions and/or hardware to perform as a traffic control unit 525C and/or to provide and/or process environmental and roadside sensor information 525D or to act as a location reference for GNSS relative location between it and vehicles. In an embodiment, RSU(s) 525 may contain a network interface 525B (and/or a wireless transceiver 525E), which, in an embodiment, may communicate with external servers such as traffic optimization server 565, vehicle information server 555, and/or environmental data server 540. In an embodiment, wireless transceiver 525E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 525E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 525 over a wireless link, and claimed subject matter is not limited in this respect.

RSU(s) 525 may receive location, status, GNSS and other sensor measurements, and capability information from vehicle A 580 and/or vehicle B 590 and/or mobile device 502 such as GNSS measurements, sensor measurements, velocity, heading, location, stopping distance, priority or emergency status and other vehicle-related information. In some embodiments, mobile device 502 may obtain such data from vehicle A 580. In an embodiment, environmental information such as road surface information/status, weather status, and camera information may be gathered and shared with vehicles, either via point to point or broadcast messaging. RSU(s) 525 may utilize received information, via wireless transceiver 525E, from vehicle A 580 and/or vehicle B 590 and/or mobile device 502, environmental and roadside sensors 525D, and network information and control messages from, for example, traffic control and optimization server 565 to coordinate and direct traffic flow and to provide environmental, vehicular, safety and announcement messages to vehicle A 580 and vehicle B 590.

Processor 525A may be configured to operate a network interface 525B, in an embodiment, which may be connected via a backhaul to network 570, and which may be used, in an embodiment, to communicate and coordinate with various centralized servers such as a centralized traffic control and optimization server 565 that monitors and optimizes the flow of traffic in an area such as within a city or a section of a city or in a region. Network interface 525B may also be utilized for remote access to RSU(s) 525 for crowd sourcing of vehicle data, maintenance of the RSU(s) 525, and/or coordination with other RSU(s) 525 or other uses. RSU(s) 525 may have a processor 525A configured to operate traffic control unit 525C which may be configured to process data received from vehicles such as vehicle A 580 and vehicle B 590 such as location data, stopping distance data, road condition data, identification data and other information related to the status and location of nearby vehicles and environment. RSU(s) 525 may have a processor 525A configured to obtain data from environmental and roadside sensors 525D, which may include temperature, weather, camera, pressure sensors, road sensors (for car detection, for example), accident detection, movement detection, speed detection and other vehicle and environmental monitoring sensors.

In an embodiment, vehicle A 580 may also communicate with mobile device 502 using short range communication and personal networks such as Bluetooth, Wi-Fi or Zigbee or via V2X or other vehicle-related communication protocols, for example, in an embodiment to access WAN and/or Wi-Fi networks and/or, in an embodiment, to obtain sensor and/or location measurements from mobile device 502. In an embodiment, vehicle A 580 may communicate with mobile device 502 using WAN related protocols through a WAN network, such as via WAN base station 520 or using Wi-Fi either directly peer to peer or via a Wi-Fi access point. Vehicle A 580 and/or vehicle B 590 may communicate using various communication protocols. In an embodiment, vehicle A 580 and/or vehicle B 590 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A 580 may communicate over WAN networks using WAN protocols via base station 520 or with wireless LAN access point 530 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 580 and/or vehicle B 590 and/or mobile device 502, in an embodiment, may contain one or more GNSS receivers (e.g., GNSS receiver 770 for vehicle A and/or B, GNSS receiver 980 for mobile device 502) for reception of GNSS signals 512, from GNSS satellites 510, for location determination, time acquisition and time maintenance. Various GNSS systems may be supported alone or in combination, using GNSS receiver xxx or other receiver, to receive signals from Beidou, Galileo, GLONASS, and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 525, one or more wireless LAN access point 530 or one or more base stations 520. Various GNSS signals 512 may be utilized in conjunction with car sensors to determine location, velocity, proximity to other vehicles such as between vehicle A 580 and vehicle B 590.

In an embodiment, vehicle A and/or vehicle B may access GNSS measurements and/or locations determined at least in part using GNSS as provided by mobile device 502, which, in an embodiment would also have GNSS, WAN, Wi-Fi and other communications receivers and/or transceivers. In an embodiment, vehicle A 580 and/or vehicle B 590 may access GNSS measurements (such as pseudorange measurements, Doppler measurements and satellite IDs) and/or locations determined at least in part using GNSS as provided by mobile device 502 as a fallback in case GNSS receiver 770 fails or provides less than a threshold level of location accuracy.

Vehicle A 580 and/or Vehicle B 590 and/or mobile device 502 (as proxy for vehicle A 580) may access various servers on the network such as vehicle information server 555, route server 545, location server 560, map server 550, and environmental data server 540.

Vehicle information server 555, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 555 may also provide information in regard to vehicle size, shape, capabilities, identification, ownership, occupancy, and/or determined location point (such as, for example, the location of the GNSS receiver) and the location of the car boundaries relative to the determined location point.

Route server 545, may receive current location and destination information, and provide routing information for the vehicle, map data, alternative route data and/or traffic and street conditions data.

Location server 560, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 550 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 540 may, in an embodiment, provide weather and/or road related information, traffic information, terrain information, and/or road quality & speed information and/or other pertinent environmental data.

In an embodiment, Vehicles 580 and 590 and mobile devices 502, in FIG. 5, may communication over network 570 via various network access points such as wireless LAN access point 530 or wireless WAN base station 520 over network 570. Vehicles 580 and 590 and mobile devices 502 may also, in some embodiments, communicate directly between devices, between vehicles and device to vehicle and vehicle to device using various short range communications mechanisms to communicate directly without going over network 870, such as via Bluetooth, Zigbee and 5G new radio standards.

Figure 6:
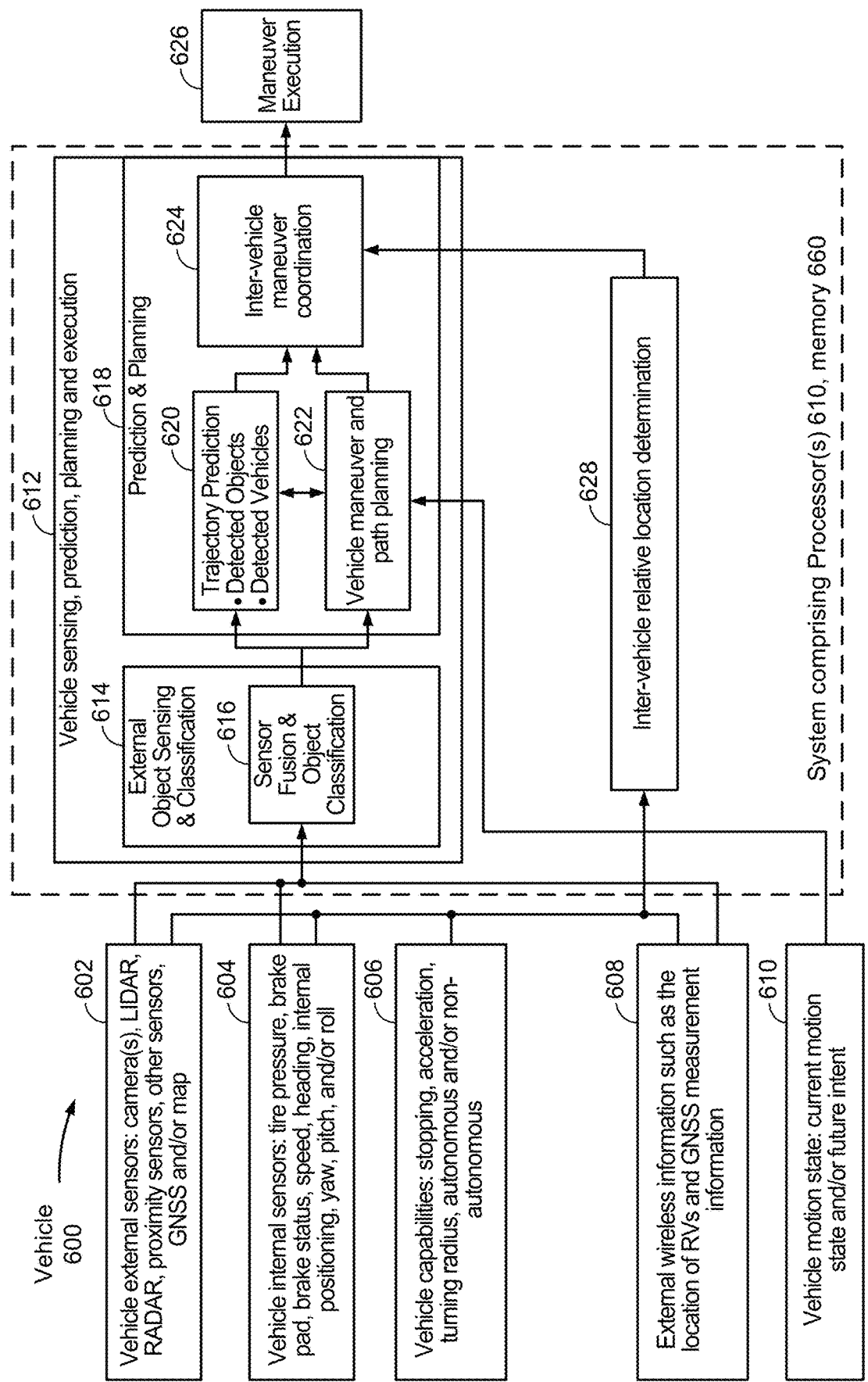
FIG. 6 comprises a functional block diagram of a vehicle, according to an embodiment.

FIG. 6 comprises a functional block diagram of a vehicle 600, according to an embodiment. The vehicle 600 we correspond to LV 104 and/or RVs 106 of FIG. 1, as described in the embodiments above. Moreover, hardware and/or software components for executing the blocks shown in FIG. 6 are illustrated in FIG. 7 and described in more detail below.

As shown in FIG. 6, vehicle 600 may receive vehicle and environment information from vehicle external sensors 602, vehicle internal sensors 604, vehicle capabilities 606, external wireless information such as the location of RVs and GNSS measurement information 608 (from the environment, from other vehicles, from RSU(s), from system servers) and/or from vehicle motion state 610 (describing current and/or future motion states). The messages received by the LV 104 and/or RVs 106 of FIG. 1 described in the embodiments above, for example, may convey the data provided in blocks 608 and/or 610. The received vehicle, sensor, and environment information may, in an embodiment, be processed in one or more processor(s) 710, DSP 720 and memory 760 (further described in FIG. 7), connected and configured to provide external object sensing and classification, prediction and planning, and maneuver execution, as well as to determine and update V2X or other wireless data element values, including GNSS data element values, and to transmit, via one or more wireless transceiver(s) 730, messaging including the determined data elements. The messaging and data elements may be sent and received via various means, protocols and standards, such as via SAE or European Telecommunications Standards Institute (ETSI) CV2X messages and data elements or other wireless and wireless V2X protocols supported by wireless transceiver(s) 730. In some embodiments, vehicle 700 may be a legacy vehicle, lacking the ability to exchange messages and/or data elements via CV2X messages and/or via wireless V2X protocols. Thus, in some embodiments, vehicle 700 may receive V2X data elements from CV2X messages received by the mobile device 502 of FIG. 5 (e.g., an example of the proxy device 900 discussed below in connection with FIG. 9). In embodiments in which the mobile device 502 of FIG. 5 acts as a proxy for the vehicle 600, any suitable data received by the vehicle 600 may additionally and/or alternatively be received by the vehicle 600 from the mobile device 502 (after the mobile device 502 has received the data from the source of the data such as the servers 540, 545, 550, 555, 560, and/or 565 of FIG. 5, the RSU(s) 525, vehicle B 590, and the like).

Inter-vehicle relative location determination block 628 may be used to determine relative location of vehicles in an area of interest. In an embodiment, GNSS data is exchanged with vehicles (e.g., RVs), or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages (e.g., BSMs) from other vehicles other devices and location information for vehicle 600 to determine an approximate relative location and/or an approximate range between vehicles.

In an embodiment, other vehicle-related input sources, such as servers 555, 545, 560, 550, and 540 of FIG. 5, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 624 to determine maneuver execution 626. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 550 may be utilized in conjunction with relative and/or absolute data from neighboring vehicles and/or from RSU(s) 525 to determine high confidence absolute location for a plurality of vehicles and relative location with respect to the road/map. For example, if vehicle A 580 of FIG. 5 has high accuracy/high confidence location than other vehicles in communication with vehicle A 580, such as vehicle B 590 of FIG. 5 may use GNSS information for a highly accurate relative location and the highly accurate location from vehicle A 580 sent to vehicle B 590 to determine a highly accurate location for vehicle B 590, even if the systems of vehicle B 590 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 550 is accurate, the ability to propagate highly accurate location data from vehicle A 580 to surrounding vehicles such as vehicle B 590 enables the surrounding vehicles to also accurately determine their relative location versus the map data, even in otherwise troublesome signal/location environments. Vehicle information server 555 may provide vehicle information such as size, shape, and antenna location which may be utilized, for example, by vehicle A or other vehicles to determine not just the relative location between the GNSS receiver on vehicle A 580 and, for example, vehicle B 590, but also the distance between the closest points of Vehicle A 580 and Vehicle B 590. In an embodiment, traffic information from the traffic control and optimization server 565 may be utilized to determine overall path selection and rerouting, used in conjunction with route server 545 (in an embodiment). In an embodiment, environmental data server 540 may provide input on road conditions, black ice, snow, water on the road and other environmental conditions which may also impact the decisions and decision criteria in inter-vehicle maneuver coordination block 624 and maneuver execution block 626. For example, in icy or rainy conditions, the vehicle 600 may execute and/or request increased inter-vehicle distance from adjacent vehicles or may choose route options that avoid road hazard conditions such as black ice and standing water.

Block 628 may be implemented using various dedicated or generalized hardware and software, such as using processor 610 (an example of processor 710 or DSP 720 of FIG. 7) and memory 760 (again, as shown in FIG. 7) or, in an embodiment, in specialized hardware blocks such as dedicated sensor processing and/or vehicle messaging cores. According to some embodiments, the location of nearby vehicles may be determined through various means such as based on signal-based timing measurements such as Round-Trip Time (RTT) and Time Of Arrival (TOA), signal strength of a broadcast signal for vehicles, and a distance determined based upon broadcast latitude and longitude from a neighboring vehicle and the current location of the vehicle. Additionally or alternatively, location of nearby vehicles may be determined from sensor measurements such as 5G New Radio (NR), Ultra wide band (UWB), Light Detection and Ranging (LIDAR), Radio Detection And Ranging (RADAR), SONAR, camera measurements or any combination thereof. In an embodiment, some or all of blocks 602, 604, 606, 608 and/or 610 may have dedicated processing cores, for example, to improve performance and reduce measurement latency. In an embodiment, some or all of blocks 602, 604, 606, 608 and/or 610 may share processing with block 628.

Vehicle external sensors 602 may comprise, in some embodiments, cameras, LIDAR, RADAR, proximity sensors, other sensors (e.g., devices for detecting weather, rain, snow, pressure changes, vertical directionality, ground position, proximity detection, etc.), GNSS receivers 770 and received data used with the sensors such as map data, environmental data, location, route and/or other vehicle information such as may be received from other vehicles, devices and servers such as, in an embodiment, map server 550, route server 545, vehicle information server 555, environmental data server 540, location server 560, and/or from associated devices such as mobile device 502, which may be present in or near to the vehicle such as vehicle A 580. For example, in an embodiment, mobile device 502 may provide an additional source of GNSS measurements, may provide an additional source of motion sensor measurements, or may provide network access as a communication portal to a WAN, Wi-Fi or other network, and as a gateway to various information servers such as servers 540, 545, 550, 555, 560, and/or 565.

Figure 8:
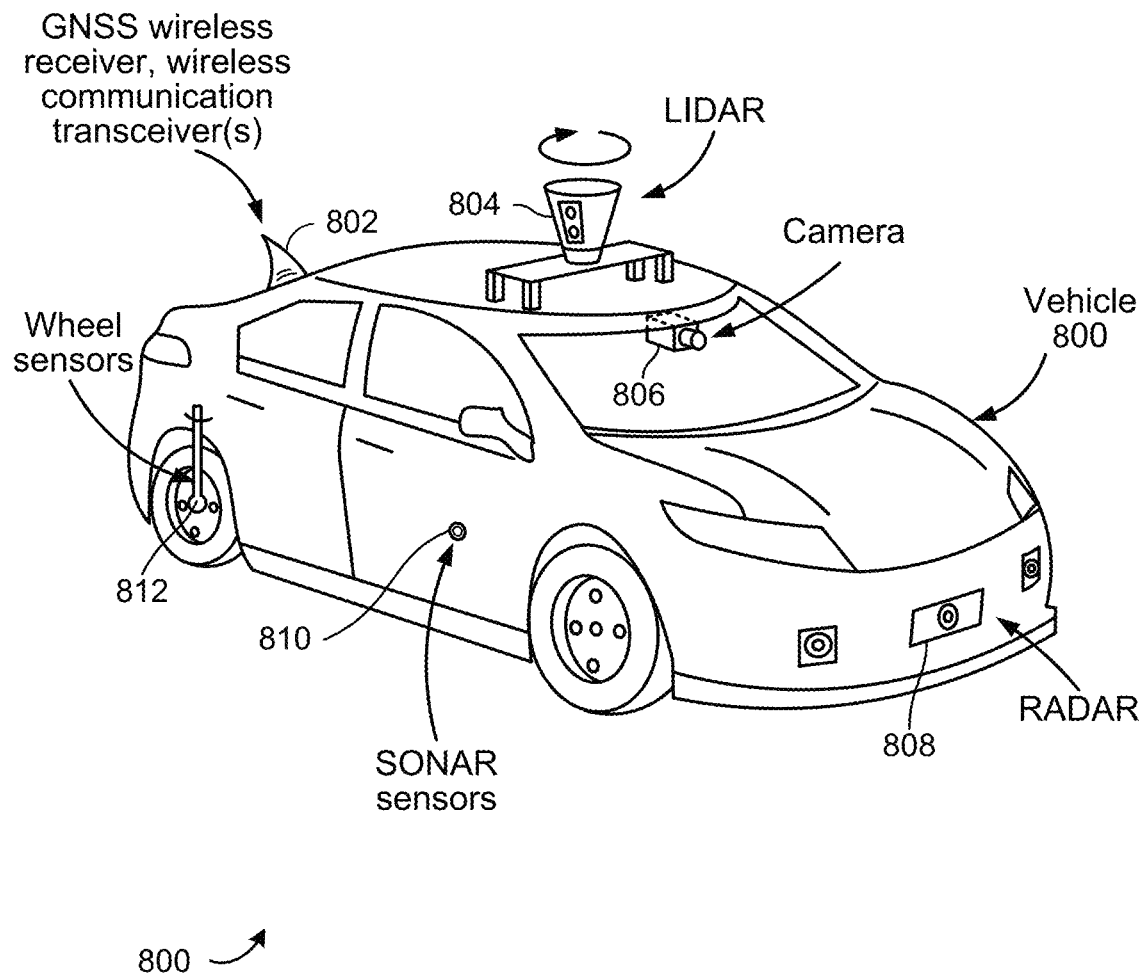
FIG. 8 is a perspective view of an example vehicle, according to an embodiment.

It is understood that the vehicle 600 may contain one or a plurality of cameras. In an embodiment, a camera may be front facing, side facing, rear facing or adjustable in view (such as a rotatable camera). As shown in FIG. 8, for example, there may be multiple cameras facing the same plane. For example, the cameras 806 may be one of two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 804 may be roof mounted and rotating or may be focused on a particular point of view (such as front facing, rear facing, side facing). LIDAR 804 may be solid state or mechanical. Proximity sensors may be ultrasonic, RADAR-based, light-based (such as based on infrared range finding), and/or capacitive (surface touch oriented or capacitive detection of metallic bodies). Other sensors may include various sensing capabilities and technologies such as barometric pressure sensors, devices for detecting weather, pressure changes, vertical directionality, ground position, proximity detection, moisture detectors, rain and/or snow sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 604 may comprise wheel sensors 812 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 604 and vehicle external sensors 602 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 628 to determine vehicle location. The car status values derived from measurements from internal and external sensors may be further combined with car status values and/or measurements from other sensor systems using a general or applications processor. For example, blocks 628 and/or 624 or may be implemented on a dedicated or a centralized processor to determine data element values for V2X messaging which may be sent utilizing wireless transceiver(s) 730 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 730 and antenna(s) 732.

In an embodiment, vehicle capabilities 606 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive trains may share performance estimates for drive-performance related estimates such as breaking/stopping distance, turning radius, and acceleration performance. Vehicle performance estimates may also be obtained, for example, using external V2X input(s) 608, over a wireless network from vehicular data servers on the network. This is particularly helpful to obtain information for vehicles that are not wireless capable and cannot provide vehicular information directly. In an embodiment, vehicle capabilities 606 may also be influenced by car component status such as tire wear, tire brand capabilities, brake pad wear, brake brand and capabilities, and engine status. In an embodiment, vehicle capabilities 606 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 602 and/or vehicle internal sensors 604, may be weighted more heavily and/or given preference in determining capability.

V2X vehicle sensing, prediction, planning execution 612 handles the receipt and processing of information from blocks 602, 604, 606, 608 and 610, via external object sensing and classification block 614, in part utilizing sensor fusion and object classification block 616 to correlate, corroborate and/or combine data from input blocks 602, 604, 606, 608 and 610. Block 614 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 614 may utilize GNSS measurement messages from other vehicles to determine the relative positioning to other vehicles. This output from block 614 may be provided to prediction and planning block 618, which determines detected objects and vehicles and their associated trajectory via block 620 and determines vehicle maneuver and path planning in block 622, the outputs of which are utilized in block 626 vehicle maneuver execution either directly or via V2X inter-vehicle negotiation block 624, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 7 comprises a functional block diagram of a vehicle 700, according to an embodiment. The vehicle 700 may comprise for example, a car, bus, truck, motorcycle and/or other motorized vehicle that may, at least in part, be driven autonomously.

As shown in FIG. 7, vehicle 700 may include a variety of software and hardware components connected via bus 701. For example, the vehicle 700 may include one or more processor(s) 710 and memory 760. Memory 760 may include executable instructions, executable by the processor(s) 710, to perform autonomous driving activities including, but not limited to, external object sensing and classification, prediction and planning, and maneuver execution. In some embodiments, memory 760 may include driver assistance module 765. Driver assistance module 765 may correspond to code that, when executed by the processor(s) 710, cause the processor(s) 710 to perform the operations described above in connection with any suitable remote vehicle (RVs) of FIG. 1, method 200 of FIG. 2, and any operations discussed in connection with the smart vehicles of FIG. 3.

Vehicle 700 may include one or more wireless transceivers, such as wireless transceiver(s) 730, for transmitting and receiving data via various means, protocols and standards, such as via SAE or European Telecommunications Standards Institute (ETSI) CV2X messages and data elements or other wireless and wireless protocols. In some embodiments, the wireless transceiver(s) 730 may be configured to transmit and receive data messages and elements via a short-range wireless communications protocol (e.g., Bluetooth®, Bluetooth Low Energy®, etc.), and/or via a local and/or wide area network, and/or via a cellular network, and/or via any suitable wireless network. Of course, it should be understood that these are merely examples of networks that may be utilized by the vehicle 700 over a wireless link, and claimed subject matter is not limited in this respect. In an embodiment, wireless transceiver(s) 730 may comprise various combinations of WAN, WLAN, and/or PAN transceivers. In an embodiment, wireless transceiver(s) 730 may also comprise a Bluetooth transceiver, a ZigBee transceiver, or other PAN transceiver.

In some embodiments, the vehicle 700 may include a Global Navigation Satellite System (GNSS) receiver 770. The GNSS receiver 770 may be configured to receive and digitally process signals from a navigation satellite (and/or other vehicles) in order to provide position, velocity, and time of the receiver. The GNSS receiver 770 may include hardware and/or software components. In an embodiment, GNSS signals from GNSS Satellites received by the GNSS receiver 770 are utilized by vehicle 700 for location determination and/or for the determination of GNSS signal parameters and demodulated data. In an embodiment, signals received by wireless transceiver(s) 730 are used for location determination, alone or in combination with GNSS signals received by the GNSS receiver 770.

Examples of network technologies that may support wireless transceiver(s) 730 are GSM, CDMA, WCDMA, LTE, 7G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the $3^{rd}$ Generation Partnership Project II (3GPP2). WCDMA is also part of the Universal Mobile Telecommunications System (UMTS) and may be supported by an HNB.

Wireless transceiver(s) 730 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 7G NR base stations. In an embodiment, further wireless base stations may comprise a WLAN and/or PAN transceiver.

In an embodiment, vehicle 700 may contain one or more camera(s) 735. In an embodiment, the camera(s) 735 may comprise a camera sensor and mounting assembly. Different mounting assemblies may be used for different cameras on vehicle 700. For example, front facing cameras may be mounted in the front bumper, in the stem of the rear-view mirror assembly or in other front facing areas of the vehicle 700. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

In some embodiments, at least some of camera(s) 735 may be inward facing. The camera(s) 735 may be utilized to capture one or more images from which vehicle data may be derived (e.g., an image of the speedometer from which speed can be derived, an image of a heading indicator from which a heading may be derived, etc.). In some embodiments, camera(s) 735 may be utilized to capture one or more images of at least some portion of one or more of the vehicle occupants.

Vehicle motion sensor(s) 740 may include any suitable number of accelerometers, gyros, and/or magnetometers. In some embodiments, the vehicle motion sensor(s) 740 may be part of an inertial measurement unit of the vehicle 700. The vehicle motion sensor(s) 740 may be utilized to provide and/or verify motion and directional information, to monitor wheel and drive train performance, and/or to measure amplitude and frequency of oscillations of the vehicle 700 and/or parts of the vehicle 700. By way of example, an accelerometer (e.g., a 3-axis accelerometer) can measure vibrations of the vehicle 700 such as movement or mechanical oscillation about an equilibrium position of a component of the vehicle 700. Accelerometers, in an embodiment, may also be utilized to verify actual time of impact with road hazards such as potholes relative to predicted times based on existing stopping and acceleration models as well as steering models. Gyros and magnetometers of the vehicle sensor(s) 745 may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors such as speed sensors, wheel tick sensors, and/or odometer measurements. In some embodiments, vehicle sensor(s) 745 may be configured to measure oscillations and/or oscillation frequency corresponding to motions performed by the vehicle 700.

The vehicle 700 may include LIDAR 750. LIDAR 750 may use pulsed laser light to measure ranges to objects. While camera(s) 735 can provide object detection, LIDAR 750 may provide a means to detect the distances (and orientations) of the objects with more certainty, especially in regard to objects of unknown size and shape. LIDAR 750 measurements may also be used to estimate rate of travel, vector directions, relative position and stopping distance by providing accurate distance measurements and delta distance measurements.

In an embodiment, power and drive systems and related systems 775 (generator, battery, transmission, engine) and systems 755 (brake, actuator, throttle control, steering, and electrical) may be controlled by the processor(s) 710 and/or hardware or software or by an operator of the vehicle or by some combination thereof. The systems 755 and power and drive systems and related systems 775 may be utilized in conjunction with performance parameters and operational parameters, to enable autonomously (and manually, relative to alerts and emergency overrides/braking/stopping) driving and operating a vehicle 700 safely and accurately, such as to safely, effectively and efficiently merge into traffic, stop, accelerate and otherwise operate the vehicle 700. In an embodiment, input from the various sensor systems such as camera(s) 735, vehicle sensor(s) 1010 (including accelerometers, gyros, manometers, etc.), LIDAR 750, GNSS receiver 770, RADAR 753, input, messaging and/or measurements from wireless transceiver(s) 730 or various combinations thereof, may be utilized by processor(s) 710 and/or DSP 720 or other processing systems to control power and drive systems and related systems 775 and systems 755.

GNSS receiver 770 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 770, may receive RF signals from one or more GNSS satellites using one or more antenna(s) 772. The GNSS receiver 770 may support one or more GNSS constellations as well as other satellite-based navigation systems. For example, in an embodiment, GNSS receiver 770 may support global navigation satellite systems such as GPS, the GLONASS, Galileo, and/or BeiDou, or any combination thereof. In an embodiment, GNSS receiver 770 may support regional navigation satellite systems such as NavIC or QZSS or a combination thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver 770 and antenna(s) 772 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 770 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudo-range measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from road-side units (RSUs), to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an road-side unit (RSU) equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 753, uses transmitted radio waves that are reflected off of objects. The reflected radio waves are analyzed, based on the time taken for reflections to arrive and other signal characteristics of the reflected waves to determine the location of nearby objects. RADAR 753 may be utilized to detect the location of nearby cars, roadside objects (signs, other vehicles, pedestrians, etc.) and will generally enable detection of objects even if there is obscuring weather such as snow, rail or hail. Thus, RADAR 753 may be used to complement LIDAR 750 and camera(s) 735 in providing ranging information to other objects by providing ranging and distance measurements and information when visual-based systems typically fail. Furthermore, RADAR 753 may be utilized to calibrate and/or sanity check other systems such as LIDAR 750 and camera(s) 735. Ranging measurements from RADAR 753 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

Input/output device(s) 768 may include any suitable one or more audio devices (e.g., one or more speakers) and/or one or more display(s) (e.g., a dashboard display, a media display, a projected display, and the like). The input/output device(s) 768 may provide an interface through which a mobile device (e.g., mobile device 502 of FIG. 5) can provide data for presentation at vehicle 700 (e.g., in scenarios in which mobile device 502 is acting as proxy for the vehicle 700.

FIG. 8 is a perspective view of an example vehicle 800 (e.g., an example of the vehicle 700 of FIG. 7), according to an embodiment. Here, some of the components discussed with regard to FIG. 8 and earlier embodiments are shown. As illustrated and previously discussed, the vehicle 800 can have one or more camera(s) (e.g., each an example of camera(s) 735 of FIG. 7) such as a rear view mirror-mounted camera 806, a passenger facing camera (not shown), front fender-mounted camera (not shown), side mirror-mounted camera (not shown) and a rear camera (not shown, but typically on the trunk, hatch or rear bumper). Vehicle 800 may also have LIDAR 804 (an example of the LIDAR 750 of FIG. 7), for detecting objects and measuring distances to those objects; LIDAR 804 is often roof-mounted, however, if there are multiple LIDAR units, they may be oriented around the front, rear and sides of the vehicle. Vehicle 800 may have other various location-related systems such as a receiver 802 such as a GNSS wireless receiver (typically located in the shark fin unit on the rear of the roof, as indicated) and/or various wireless transceivers (such as WAN, WLAN, V2X; typically, but not necessarily, located in the shark fin), RADAR 808 (typically in the front bumper), and SONAR 810 (typically located on both sides of the vehicle, if present. Wheel sensors 812 (an example of vehicle motion sensor(s) 740 of FIG. 7) may also be present and may include wheel sensors and/or drive train sensors such as tire pressure sensors, accelerometers, gyros, and wheel rotation detection and/or counters.

In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. By way of example, the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 8 is intended to provide exemplary locations of various sensors in an embodiment of vehicle 800.

FIG. 9 is a block diagram of an embodiment of a proxy device 900, in accordance with at least one embodiment. According to some embodiments, the proxy device 900 may comprise a stand-alone device mobile device (e.g. a smartphone, a laptop, a tablet PC, etc.), which may be communicatively coupled with other components/devices of the vehicle or RSU. It also can be noted that the proxy device 900 may be utilized in the similar manner by V2X entities other than a vehicle or RSU. Additionally, embodiments may not necessarily be limited to V2X communications. As such, alternative embodiments may include a device similar to the proxy device 900, having similar components to those shown in FIG. 9 and capable of performing the functions of the vehicles and/or RSU described in the previously-discussed embodiments, but without V2X functionality.

It should also be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be located, for example, at different physical locations on a vehicle, RSU, or other V2X entity.

The proxy device 900 is shown comprising hardware elements that can be electrically coupled via a bus 905 (or may otherwise be in communication, as appropriate). The hardware elements may include a processor(s) 910 which can include without limitation one or more general-purpose processors, one or more special-purpose processors (such as digital signal processing (DSP) chips (e.g., DSP 920), graphics acceleration processors, application-specific integrated circuits (ASICs), and/or the like), and/or other processing structure or means.

The proxy device 900 also can include one or more input devices 970, which can include devices related to user interface (e.g., a touch screen, touchpad, microphone, button(s), dial(s), switch(es), and/or the like). Similarly, the one or more output devices 915 may be related to interacting with a user (e.g., via a display, light emitting diode(s) (LED(s)), speaker(s), etc.). For example, the one or more output devices 915 may be utilized by the proxy device 900 to display driver assistance information 112 of FIG. 1.

The proxy device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. The wireless communication interface 930 can enable the proxy device 900 to communicate to other V2X devices (e.g., vehicle B 590, RSU(s) 525, servers 540, 545, 550, 555, 560, and 565 of FIG. 5) and devices that lack V2X communication capabilities (e.g., vehicle A 580). This can include the various forms of communication of the previously-described embodiments. And as such, it may be capable of transmitting direct communications, broadcasting wireless signals, receiving direct and/or broadcast wireless signals, and so forth. Accordingly, the wireless communication interface 930 may be capable of sending and/or receiving RF signals from various RF channels/frequency bands. Communication using the wireless communication interface 930 can be carried out via one or more wireless communication antenna(s) 932 that send and/or receive wireless signals 934.

The proxy device 900 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensor(s) 940 may be used, for example, to determine certain real-time characteristics of the vehicle, such as location, velocity, acceleration, and the like. As previously indicated, sensor(s) 940 may be used to help a vehicle determine its location.

Embodiments of the proxy device 900 may also include a GNSS receiver 980 capable of receiving signals 984 from one or more GNSS satellites using an antenna 982 (which, in some embodiments, may be the same as wireless communication antenna(s) 932). Positioning based on GNSS signal measurement can be utilized to determine a current location of the proxy device 900, and may further be used as a basis to determine the location of a detected object. The GNSS receiver 980 can extract a position of the proxy device 900, using conventional techniques, from GNSS satellites of a GNSS system, such as Global Positioning System (GPS) and/or similar satellite systems.

The proxy device 900 may further comprise and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the proxy device 900 also can comprise software elements (some of which are not shown in FIG. 9) including an operating system, device drivers, executable libraries, and/or other code, such as one or more application programs, which may comprise computer programs provided by various embodiments, and/or may be designed to implement methods and/or configure systems as described herein. Software applications (e.g., the driver assistance module 965) stored in memory 960 and executed by processor(s) 910 may be used to implement the functionality of the proxy devices (e.g., mobile devices) described herein. Moreover, one or more procedures described with respect to the method(s) discussed herein may be implemented as part of the driver assistance module 965 and stored in memory 960. The code/instructions of driver assistance module 965 are executable by the proxy device 900 (and/or processor(s) 910 or DSP 920 within proxy device 900) and may include the functions illustrated in the methods of FIG. 4 described above. In an aspect, then, such code and/or instructions can be used to configure and/or adapt a general-purpose computer (or other device) to perform one or more operations in accordance with the described methods.

Processor(s) 910 may receive location, status, GNSS and other sensor measurements, and capability information from vehicle A 580 and/or vehicle B 590 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging (e.g., from RSU(s) 525, vehicle A 580, vehicle B 590, or any suitable combination of the servers of FIG. 5). Processor(s) 910 may utilize the received information to coordinate and direct traffic flow and to provide environmental, vehicular, safety and announcement messages to vehicle A 580, which would otherwise not be able to ascertain such information. By utilizing the proxy device 900, a legacy vehicle can participate in a V2X environment such that information provided by other V2X entities can be presented to the driver of the legacy vehicle.

Processor 525A may be configured to operate a network interface 525B, in an embodiment, which may be connected via a backhaul to network 570, and which may be used, in an embodiment, to communicate and coordinate with various centralized servers such as a centralized traffic control and optimization server 565 that monitors and optimizes the flow of traffic in an area such as within a city or a section of a city or in a region. Network interface 525B may also be utilized for remote access to RSU(s) 525 for crowd sourcing of vehicle data, maintenance of the RSU(s) 525, and/or coordination with other RSU(s) 525 or other uses. RSU(s) 525 may have a processor 525A configured to operate traffic control unit 525C which may be configured to process data received from vehicles such as vehicle A 580 and vehicle B 590 such as location data, stopping distance data, road condition data, identification data and other information related to the status and location of nearby vehicles and environment. RSU(s) 525 may have a processor 525A configured to obtain data from environmental and roadside sensors 525D, which may include temperature, weather, camera, pressure sensors, road sensors (for car detection, for example), accident detection, movement detection, speed detection and other vehicle and environmental monitoring sensors.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 960 of FIG. 9) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method for a mobile device to provide driving assistance information, comprising:
   determining, by one or more processors of the mobile device, whether the mobile device is temporally collocated with a vehicle;
   receiving, by the one or more processors via one or more transceivers of the mobile device, one or more data messages from a second device associated with a remote vehicle, wherein:
      the one or more data messages are received via a vehicle-to-everything messaging protocol,
   in response to a determination that the mobile device is temporally collocated with the vehicle, determining, by the one or more processors, whether a data message of the one or more data messages received from the second device is relevant to the vehicle with which the mobile device is temporally collocated based on identifying, by the one or more processors, one or more vehicle attributes regarding vehicles in an environment of the remote vehicle, from the data message; and
   in response to a determination that the data message is relevant to the vehicle:

determining, by the one or more processors, driving assistance information based at least in part on data extracted from the relevant data message, and
providing the driving assistance information.

2. The method of claim 1, wherein the one or more data messages comprise one or more basic safety messages corresponding to the vehicle-to-everything messaging protocol.

3. The method of claim 1, wherein determining whether the data message is relevant to the vehicle comprises identifying that the data message comprises:
environmental information corresponding to a first area surrounding the vehicle,
road conditions corresponding to a second area surrounding the vehicle,
a speed limit corresponding to a third area,
a first set of vehicle attributes corresponding to the vehicle,
a second set of vehicle attributes corresponding to a different vehicle, the different vehicle being identified as being located within a first threshold distance of the vehicle, or
mapping information corresponding to at least one of roadways or landmarks within a threshold distance of the vehicle,
or any combination thereof.

4. The method of claim 1, wherein determining whether the data message is relevant to the vehicle comprises:
identifying, by the one or more processors, a relative location corresponding to the one or more vehicle attributes;
identifying that the relative location corresponds to a location that is within a threshold distance of the mobile device; and
storing, by the one or more processors, the one or more vehicle attributes from the data message as a first set of vehicle attributes associated with the vehicle.

5. The method of claim 4, further comprising:
receiving, by the one or more processors, a subsequent data message;
identifying, by the one or more processors, a first set of vehicle attributes from the subsequent data message; and
matching, by the one or more processors, the first set of vehicle attributes from the subsequent data message to a second set of vehicle attributes associated with the vehicle, wherein the data message is determined to be relevant when a threshold number of attributes of the first set of vehicle attributes from the data message match attributes of the second set of vehicle attributes associated with the vehicle.

6. The method of claim 1, wherein providing the driving assistance information comprises presenting at least one of a visual indicator or an audible alert utilizing at least one a first output device of the mobile device or a second output device of the vehicle.

7. The method of claim 1, wherein the driving assistance information is provided to a display device, the display device configured to render the driving assistance information, wherein the driving assistance information comprises a map representing an area and a plurality of vehicles within that area, the plurality of vehicles comprising the vehicle with which the mobile device is collocated.

8. A mobile device comprising:
one or more transceivers;
a memory; and
one or more processors communicatively coupled with the memory and the one or more transceivers, the one or more processors being configured to:

determine whether the mobile device is temporally collocated with a vehicle;
receive, via the one or more transceivers, one or more data messages from a second device associated with a remote vehicle, wherein:
the one or more data messages are received via a vehicle-to-everything messaging protocol;
in response to a determination that the mobile device is temporally collocated with the vehicle, determine whether a data message of the one or more data messages received from the second device is relevant to the vehicle based on identifying, one or more vehicle attributes regarding vehicles in an environment of the remote vehicle, from the data message; and
in response to a determination that the data message is relevant to the vehicle:
determine driving assistance information based at least in part on data extracted from the relevant data message, and
provide the driving assistance information.

9. The mobile device of claim 8, wherein the one or more data messages comprise one or more basic safety messages corresponding to the vehicle-to-everything messaging protocol.

10. The mobile device of claim 8, wherein determining whether the data message is relevant to the vehicle comprises identifying that the data message comprises:
environmental information corresponding to a first area surrounding the vehicle,
road conditions corresponding to a second area surrounding the vehicle,
a speed limit corresponding to a third area,
a first set of vehicle attributes corresponding to the vehicle,
a second set of vehicle attributes corresponding to a different vehicle, the different vehicle being identified as being located within a first threshold distance of the vehicle, or
information corresponding to at least one of a roadway or landmark within a threshold distance of the vehicle,
or any combination thereof.

11. The mobile device of claim 8, wherein determining whether the data message is relevant to the vehicle causes the one or more processors to:
identify a relative location corresponding to the one or more vehicle attributes;
identify that the relative location corresponds to a location that is within a threshold distance of the mobile device; and
store the one or more vehicle attributes from the data message as a first set of vehicle attributes associated with the vehicle.

12. The mobile device of claim 8, wherein one or more processors are further configured to:
receive a subsequent data message;
identify a first set of vehicle attributes from the subsequent data message; and
match the first set of vehicle attributes from the second data message to a second set of vehicle attributes associated with the vehicle, wherein the data message is determined to be relevant when a threshold number of attributes of the first set of vehicle attributes from the data message match attributes of the second set of vehicle attributes associated with the vehicle.

13. The mobile device of claim 8, wherein providing the driving assistance information comprises presenting at least one of a visual indicator or an audible alert utilizing at least one a first output device of the mobile device or a second output device of the vehicle.

14. The mobile device of claim 8, wherein the driving assistance information is provided to a display device, the display device configured to render the driving assistance information, wherein the driving assistance information comprises a map representing an area and a plurality of vehicles within that area, the plurality of vehicles comprising the vehicle with which the mobile device is collocated.

15. A non-transitory computer-readable medium having instructions stored for providing driving assistance information, wherein the instructions, when executed by one or more processors of a mobile device, cause the one or more processors to:
   determine whether the mobile device is temporally collocated with a vehicle;
   receive one or more data messages from a second device associated with a remote vehicle, wherein:
      the one or more data messages are received via a vehicle-to-everything messaging protocol,;
   in response to a determination that the mobile device is temporally collocated with the vehicle, determine whether a data message of the one or more data messages received from the second device is relevant to the vehicle with which the mobile device is temporally collocated based on identifying, one or more vehicle attributes regarding vehicles in an environment of the remote vehicle, from the data message; and
   in response to a determination that the data message is relevant to the vehicle:
      determine driving assistance information based at least in part on data extracted from the relevant data message, and
      provide the driving assistance information.

16. The non-transitory computer-readable medium of claim 15, wherein determining whether the data message is relevant to the vehicle comprises identifying that the data message comprises:
   environmental information corresponding to a first area surrounding the vehicle,
   road conditions corresponding to a second area surrounding the vehicle,
   a speed limit corresponding to a third area,
   a first set of vehicle attributes corresponding to the vehicle,
   a second set of vehicle attributes corresponding to a different vehicle, the different vehicle being identified as being located within a first threshold distance of the vehicle, or
   mapping information corresponding to at least one of roadways or landmarks within a threshold distance of the vehicle,
   or any combination thereof.

17. The non-transitory computer-readable medium of claim 15, wherein determining whether the data message is relevant to the vehicle causes the one or more processors to:
   identify a relative location corresponding to the one or more vehicle attributes;
   identify that the relative location corresponds to a location that is within a threshold distance of the mobile device; and
   store the one or more vehicle attributes from the data message as a first set of vehicle attributes associated with the vehicle.

18. The non-transitory computer-readable medium of claim 15, wherein the one or more processors are further configured to:
   receive a subsequent data message;
   identify a first set of vehicle attributes from the subsequent data message; and
   match the first set of vehicle attributes from the subsequent data message to a second set of vehicle attributes associated with the vehicle, wherein the data message is determined to be relevant when a threshold number of attributes of the first set of vehicle attributes from the data message match attributes of the second set of vehicle attributes associated with the vehicle.

19. The non-transitory computer-readable medium of claim 15, wherein providing the driving assistance information comprises presenting at least one of a visual indicator or an audible alert utilizing at least one a first output device of the mobile device or a second output device of the vehicle.

20. The non-transitory computer-readable medium of claim 15, wherein the driving assistance information is provided to a display device, the display device configured to render the driving assistance information, wherein the driving assistance information comprises a map representing an area and a plurality of vehicles within that area, the plurality of vehicles comprising the vehicle with which the mobile device is collocated.

21. A mobile device comprising:
   means for determining whether the mobile device is temporally collocated with a vehicle;
   means for receiving one or more data messages from a second device associated with a remote vehicle, wherein:
      the one or more data messages are received via a vehicle-to-everything messaging protocol;
   means for determining whether a data message of the one or more data messages received from the second device is relevant to the vehicle with which the mobile device is temporally collocated, wherein determining whether the data message is relevant to the vehicle is performed in response to a determination that the mobile device is temporally collocated with the vehicle, based on identifying, one or more vehicle attributes regarding vehicles in an environment of the remote vehicle, from the data message; and
   means for determining driving assistance information based at least in part on data extracted from the relevant data message; and
   means for providing the driving assistance information;
   wherein the driving assistance information is determined and provided in response to a determination that the data message is relevant to the vehicle.

22. The mobile device of claim 21, wherein determining whether the data message is relevant to the vehicle comprises identifying that the data message comprises:
   environmental information corresponding to a first area surrounding the vehicle,
   road conditions corresponding to a second area surrounding the vehicle,
   a speed limit corresponding to a third area,
   a first set of vehicle attributes corresponding to the vehicle,
   a second set of vehicle attributes corresponding to a different vehicle, the different vehicle being identified as being located within a first threshold distance of the vehicle, or
   mapping information corresponding to at least one of roadways or landmarks within a threshold distance of the vehicle,
   or any combination thereof.

23. The mobile device of claim 21, wherein the means for determining whether the data message is relevant to the vehicle further comprises:
   means for identifying a relative location corresponding to the one or more vehicle attributes;
   means for identifying that the relative location corresponds to a location that is within a threshold distance of the mobile device; and means for identifying storing the one or more vehicle attributes from the data message as a first set of vehicle attributes associated with the vehicle.

24. The mobile device of claim 21, further comprising:

means for receiving a subsequent data message;

means for identifying a first set of vehicle attributes from the subsequent data message; and means for matching the first set of vehicle attributes from the second data message to a second set of vehicle attributes associated with the vehicle, wherein the data message is determined to be relevant when a threshold number of attributes of the first set of vehicle attributes from the data message match attributes of the second set of vehicle attributes associated with the vehicle.

25. The mobile device of claim 21, wherein the means for providing the driving assistance information comprises means for presenting at least one of a visual indicator or an audible alert utilizing at least one a first output device of the mobile device or a second output device of the vehicle.

26. The mobile device of claim 21, wherein the driving assistance information is provided to a display device, the display device configured to render the driving assistance information, wherein the driving assistance information comprises a map representing an area and a plurality of vehicles within that area, the plurality of vehicles comprising the vehicle with which the mobile device is collocated.

* * * * *